(12) United States Patent
Dudde et al.

(10) Patent No.: US 10,882,719 B2
(45) Date of Patent: Jan. 5, 2021

(54) COMPOSITE ELEVATOR BELT

(71) Applicant: thyssenkrupp Elevator Innovation and Operations GmbH, Essen (DE)

(72) Inventors: Frank Peter Dudde, Collierville, TN (US); Peter Paul Feldhusen, Collierville, TN (US)

(73) Assignees: ThyssenKrupp Elevator AG, Essen (DE); ThyssenKrupp AG, Essen (DE)

( * ) Notice: Subject to any disclaimer, the term of this patent is extended or adjusted under 35 U.S.C. 154(b) by 265 days.

(21) Appl. No.: 15/940,565

(22) Filed: Mar. 29, 2018

(65) Prior Publication Data

US 2019/0301088 A1    Oct. 3, 2019

(51) Int. Cl.
*B66B 7/06* (2006.01)
*F16G 9/04* (2006.01)
*D07B 1/04* (2006.01)

(52) U.S. Cl.
CPC .............. *B66B 7/062* (2013.01); *D07B 1/04* (2013.01); *F16G 9/04* (2013.01); *D07B 2501/2007* (2013.01)

(58) Field of Classification Search
CPC ........ B66B 7/062; D07B 1/04; D07B 1/0633; D07B 1/12; D07B 2501/2007; F16G 1/21; F16G 1/22; F16G 5/04; F16G 5/06; F16G 5/24; F16G 9/04
See application file for complete search history.

(56) References Cited

U.S. PATENT DOCUMENTS

| | | | |
|---|---|---|---|
| 3,960,629 A | 6/1976 | Goldsworthy | |
| 4,559,029 A * | 12/1985 | Miranti, Jr. | F16G 5/00 474/205 |
| 4,642,080 A * | 2/1987 | Takano | F16G 1/22 474/244 |
| 5,663,225 A * | 9/1997 | Ishida | C08K 5/3415 524/211 |
| 7,926,649 B2 * | 4/2011 | Gosser | B29D 29/00 198/847 |
| 8,343,410 B2 | 1/2013 | Herbeck et al. | |
| 8,673,433 B2 * | 3/2014 | Reif | B66B 7/062 428/212 |
| 9,126,805 B2 | 9/2015 | Pelto-Huikko et al. | |
| 2004/0014544 A1 * | 1/2004 | Ito | B29D 29/085 474/251 |
| 2011/0259677 A1 | 10/2011 | Dudde et al. | |
| 2019/0299553 A1 * | 10/2019 | Dudde | B66B 7/062 |

FOREIGN PATENT DOCUMENTS

| | | |
|---|---|---|
| CN | 205739912 U | 11/2016 |
| EP | 1580453 A2 | 9/2005 |
| EP | 2990370 A1 | 3/2016 |
| EP | 3009390 A1 | 4/2016 |

* cited by examiner

*Primary Examiner* — Minh Truong
(74) *Attorney, Agent, or Firm* — The Webb Law Firm

(57) ABSTRACT

A composite elevator belt includes at least one load carrier strand extending in a longitudinal direction, a core layer encasing the at least one load carrier strand, and a first plurality of teeth extending transversely across a top surface of the core layer. The first plurality of teeth includes a root portion associated with the core layer and a tip portion. The composite elevator belt further includes a first jacket layer extending in the longitudinal direction, at least the tip portion of the first plurality of teeth being associated with a bottom surface of the first jacket layer.

18 Claims, 18 Drawing Sheets

COMPOSITE ELEVATOR BELT

BACKGROUND OF THE INVENTION

Field of the Invention

The present disclosure is generally directed to composite elevator belts for use in lifting and lowering an elevator car. More particularly, the present disclosure is directed to composite elevator belts having a load carrier including one or more core layers, one or more load carrying strands embedded in the core layer, a plurality of teeth associated with the core layer, and one or more jackets at least partially covering the load carrier. The present disclosure is also directed to methods and apparatuses for making composite elevator belts.

Description of Related Art

Elevators for vertically transporting people and goods are an integral part of modern residential and commercial buildings. A typical elevator system includes one or more elevator cars raised and lowered by a hoist system. The hoist system typically includes both driven and idler sheave assemblies over which one or more tension members attached to the elevator car are driven. The elevator car is raised or lowered due to traction between the tension members and drive sheaves. A variety of tension member types, including wire rope, V-belts, flat belts, and chains, may be used, with the sheave assemblies having corresponding running surfaces to transmit tractive force between the tension members and the sheave assemblies.

A limiting factor in the design of current elevator systems is the minimum bend radius of the tension members. If a tension member is flexed beyond its minimum bend radius, the compressive forces within the tension member may exceed the breaking strength of the tension member material. Continuous operation of the tension members below their minimum bend radii can cause fatigue at an increased and unpredictable rate and, under extreme circumstances, may result in elastic deformation and failure. Thus, minimum size of the sheaves useable in an elevator system is governed by the minimum bend radius of the tension members. For several reasons, sheaves having a smaller diameter allow for more economical elevator system designs. First, the overall component cost of an elevator system can be significantly reduced by using smaller diameter sheaves and sheave assemblies. Second, smaller diameter sheaves reduce the motor torque necessary to drive the elevator system, thereby permitting use of smaller drive motors and allowing for smaller hoistway dimensions. Additionally, decreasing the bend radius of the tension members generally permits easier installation and decreases the spool size of the tension members.

Accordingly, minimizing the bend radius of elevator tension members, and conversely increasing tension member flexibility, is desirable. Among current tension member designs, composite belts having fiber or wire strands encased in a resin or polymer generally offer the greatest flexibility. An example of a known tension member is described in U.S. Pat. No. 9,126,805 to Pelto-Huikko et al., which is directed to an elevator rope including fiber reinforcements in a polymer matrix material. A coating material surrounds the polymer matrix material to increase friction and improve wear resistance of the tension member.

When a tension member is engaged with a sheave, the tension member is subjected to compression along an outer area in contact with the sheave and tension along an outer area away from the sheave. Frictional tractive force between the tension member and the pulley can impart additional compression to the outer surface of the tension member where the tension member is bent around the sheave. Many materials used to manufacture elevator tension members are significantly stronger in tension than compression. For example, carbon fiber, which is used in many composite belt designs such as in Pelto-Huikko et al., is typically only 20-70% as strong in compression as it is in tension. Therefore, tension members are typically more likely to fail as a result of internal compression experienced during the engagement with the sheave. Accordingly, the minimum bend radii of existing tension members is governed by internal compression loads due to bending.

Current tension members of polymer-encased fiber construction are typically produced using pultrusion processes. One such process is described in U.S. Pat. No. 3,960,629 to Goldworthy, which teaches a pultrusion method utilizing a thermosetting resin applied to conductive strands and cured via electrical induction. U.S. Pat. No. 8,343,410 to Herbeck et al. teaches a similar induction-based curing process for pultruded composite fiber articles. However, current pultrusion methods often have limited production speeds, and many current processes are suitable only for production of flat profiles. Moreover, many current pultrusion processes require the use of resin additives to prevent sticking of the resin to the various machine components used in the pultrusion process. Dilution of the resin with such additives compromises the mechanical properties of the cured thermoset, resulting in decreased breaking strength of the produced articles.

SUMMARY OF THE INVENTION

In view of the foregoing, there exists a need for composite elevator belts which reduce or neutralize compression loads such that the bending radius of the tension member is reduced while maintaining a high breaking strength. Additionally, there exists a need for methods and apparatuses for forming such composite elevator belts.

Embodiments of the present disclosure are directed to a composite elevator belt including at least one load carrier, the load carrier including at least one load carrier strand extending in a longitudinal direction, a core layer encasing the at least one load carrier strand, a first plurality of teeth and grooves extending transversely across a top surface of the core layer, the first plurality of teeth including a root portion associated with the core layer and a tip portion. The grooves extend between flanks of adjacent teeth. The composite elevator belt further includes a first jacket layer extending in the longitudinal direction and at least partially covering the load carrier.

In some embodiments, each of the first plurality of teeth extends transversely across the top surface of the core layer in a direction not parallel to the longitudinal direction.

In some embodiments, the tip portion of the teeth of the load carrier is associated with a bottom surface of the first jacket layer such that the core layer and the first jacket layer define a transversely extending groove between adjacent teeth of the first plurality of teeth that is void of material.

In some embodiments, the tip portion and flanks of the load carrier are associated with a bottom surface of the first jacket layer such that the first jacket layer at least partially extends into the grooves between adjacent teeth of the first plurality of teeth.

In some embodiments, the load carrier further includes a second plurality of teeth and grooves extending transversely across a bottom surface of the core layer, the second plurality of teeth including a root portion associated with the core layer and a tip portion. The grooves extend between flanks of adjacent teeth. The composite elevator belt further includes a second jacket layer extending in the longitudinal direction and at least partially covering the load carrier.

In some embodiments, the tip portion of the load carrier is associated with a bottom surface of the first jacket layer such that the core layer and the first jacket layer define a transversely extending groove between adjacent teeth of the first plurality of teeth that is void of material.

In some embodiments, the tip portion and flanks of the load carrier are associated with a bottom surface of the first jacket layer such that the second jacket layer at least partially extends into the grooves between adjacent teeth of the first plurality of teeth.

In some embodiments, the first jacket layer and the second jacket layer are integral and comprise a single jacket layer completely enveloping the load carrier.

In some embodiments, each of the second plurality of teeth extends transversely across the bottom surface of the core layer in a direction not parallel to the longitudinal direction.

In some embodiments, the first plurality of teeth is a mirror image of the second plurality of teeth reflected about the core layer in the longitudinal direction.

In some embodiments, the first plurality of teeth is offset along the longitudinal direction relative to the second plurality of teeth.

In some embodiments, each of the first plurality of teeth has a polygonal-shaped profile in a cross section perpendicular to the longitudinal direction.

In some embodiments, the polygonal-shaped profile includes one or more of trapezoidal-shaped, parallelogram-shaped, triangle-shaped, and pentagonal-shaped.

In some embodiments, each of the first plurality of teeth has a rounded profile in a cross section perpendicular to the longitudinal direction, the rounded profile including one or more of semicircular-shaped, arcuate-shaped, elliptical-shaped, oval-shaped, and hemispherical-shaped.

In some embodiments, the teeth of the first plurality of teeth vary in profile along the length of the composite elevator belt.

In some embodiments, the teeth of the the first plurality of teeth are integrally formed with the core layer.

In some embodiments, the teeth of the the first plurality of teeth are integrally formed with the first jacket layer and extend toward the load carrier.

In some embodiments, the at least one strand is formed of an electrically conductive material.

In some embodiments, a pitch of the first plurality of teeth varies over the length of the belt.

Further embodiments of the present disclosure are directed to an elevator system including an elevator shaft having a support frame, an elevator car movable along a vertical travel path defined by the elevator shaft, a motor arrangement having at least one drive sheave rotatable via the motor arrangement, at least one elevator sheave connected to one of the elevator car and the support frame, and at least one composite elevator belt in frictional tractive engagement with the drive sheave of the motor arrangement and the at least one elevator sheave. The at least one composite elevator belt includes at least one load carrier including at least one load carrier strand extending in a longitudinal direction, a core layer encasing the at least one load carrier strand, a first plurality of teeth and grooves extending transversely across a top surface of the core layer, the first plurality of teeth including a root portion associated with the core layer and a tip portion. Grooves extend between flanks of adjacent teeth. The composite elevator belt further includes a first jacket layer extending in the longitudinal direction and at least partially covering the load carrier.

In some embodiments, each of the first plurality of teeth of the at least one composite elevator belt extends transversely across the top surface of the core layer in a direction not parallel to the longitudinal direction.

In some embodiments, the tip portion of the first plurality of teeth of the at least one composite elevator belt is associated with the bottom surface of the first jacket layer such that the core layer and the first jacket layer define a transversely extending groove between adjacent teeth of the first plurality of teeth that is void of material.

In some embodiments, the tip portion and flanks are associated with a bottom surface of the first jacket layer such that the first jacket layer at least partially extends into the grooves between adjacent teeth of the first plurality of teeth.

In some embodiments, the at least one load carrier further includes a second plurality of teeth and grooves extending transversely across a bottom surface of the core layer, the second plurality of teeth including a root portion associated with the core layer and a tip portion. The grooves extend between flanks of adjacent teeth. The composite elevator belt further includes a second jacket layer extending in the longitudinal direction and at least partially covering the load carrier.

In some embodiments, each of the second plurality of teeth of the at least one composite elevator belt extends transversely across the bottom surface of the core layer in a direction not parallel to the longitudinal direction.

Further embodiments of the present disclosure are directed to a composite elevator belt including at least one load carrier, the load carrier including at least one load carrier strand extending in a longitudinal direction, a core layer encasing the at least one strand, and a first plurality of teeth including a root portion extending from a top surface of the core layer and a tip portion spaced apart from the core layer. Each of the first plurality of teeth extends across the top surface of the core layer in a direction not parallel to the longitudinal direction. The composite elevator belt further includes a first jacket layer arranged parallel to the longitudinal direction and at least partially covering the load carrier, the first jacket layer associated with the tip portions of the first plurality of teeth such that the core layer and the first jacket layer define a transverse groove between adjacent teeth of the first plurality of teeth.

In some embodiments, the composite elevator belt further includes a second plurality of teeth extending from a bottom surface of the core layer, each of the second plurality of teeth extending across the bottom surface of the core layer in a direction not parallel to the longitudinal direction.

In some embodiments, the first plurality of teeth is a mirror image of the second plurality of teeth reflected about the core layer in the longitudinal direction.

In some embodiments, the first plurality of teeth is offset along the longitudinal direction relative to the second plurality of teeth.

In some embodiments, the at least one strand includes a plurality of load carrying fibers aligned in the longitudinal direction.

In some embodiments, each of the first plurality of teeth has a trapezoid-shaped profile in a cross section perpendicular to the longitudinal direction.

In some embodiments, each of the first plurality of teeth has a parallelogram-shaped profile in a cross section perpendicular to the longitudinal direction.

In some embodiments, each of the first plurality of teeth has an arcuate profile in a cross section perpendicular to the longitudinal direction.

In some embodiments, the teeth of the first plurality of teeth vary in profile along the length of the composite elevator belt.

In some embodiments, the teeth of the first plurality of teeth are integrally formed with the core layer.

In some embodiments, the teeth of the first plurality of teeth are integrally formed with the first jacket layer.

In some embodiments, the at least one strand includes an electrically conductive material configured to be heated by induction.

In some embodiments, the first plurality of teeth is configured such that frictional tractive engagement between the first jacket layer and an elevator sheave causes deformation of the first plurality of teeth at an angle relative to the longitudinal direction.

In some embodiments, the first plurality of teeth is configured such that frictional tractive engagement between the first jacket layer and an elevator sheave causes deformation of the at least one strand along the longitudinal direction.

In some embodiments, a pitch of the first plurality of teeth varies over the length of the belt.

Further embodiments of the present disclosure are directed to an elevator system including an elevator shaft having a support frame, an elevator car movable along a vertical travel path defined by the elevator shaft, a motor arrangement having at least one drive sheave rotatable via the motor arrangement, at least one elevator sheave connected to one of the elevator car and the support frame, and at least one composite elevator belt in frictional tractive engagement with the drive sheave of the motor arrangement and the at least one elevator sheave. The at least one composite elevator belt includes at least one load carrier, the load carrier including at least one load carrier strand extending in a longitudinal direction, a core layer encasing the at least one strand, and a first plurality of teeth including a root portion extending from a top surface of the core layer and a tip portion spaced apart from the core layer. Each of the first plurality of teeth extends across the top surface of the core layer in a direction not parallel to the longitudinal direction. The composite elevator belt further includes a first jacket layer arranged parallel to the longitudinal direction and at least partially covering the load carrier, the first jacket layer associated with the tip portions of the first plurality of teeth such that the core layer and the first jacket layer define a transverse groove between adjacent teeth of the first plurality of teeth.

In some embodiments, the at least one composite elevator belt further includes a second plurality of teeth extending from a bottom surface of the core layer, each of the second plurality of teeth extending across the bottom surface of the core layer in a direction not parallel to the longitudinal direction.

In some embodiments, the teeth of the first plurality of teeth of the composite elevator belt are a mirror image of the teeth of the second plurality of teeth of the composite elevator belt reflected about the core layer in the longitudinal direction.

In some embodiments, the first plurality of teeth of the composite elevator belt are offset along the longitudinal direction relative to the second plurality of teeth of the composite elevator belt.

In some embodiments, the at least one strand of the composite elevator belt includes a plurality of load carrying fibers aligned in the longitudinal direction.

Further embodiments of the present disclosure will now be described in the following numbered clauses:

Clause 1. A composite elevator belt comprising: at least one load carrier strand extending in a longitudinal direction; a core layer encasing the at least one load carrier strand; a first plurality of teeth extending transversely across a top surface of the core layer, the first plurality of teeth comprising a root portion associated with the core layer and a tip portion; and a first jacket layer extending in the longitudinal direction, at least the tip portion of the first plurality of teeth being associated with a bottom surface of the first jacket layer.

Clause 2. The composite elevator belt of clause 1, wherein each of the first plurality of teeth extends transversely across the top surface of the core layer in a direction not parallel to the longitudinal direction.

Clause 3. The composite elevator belt of clause 1 or 2, wherein the tip portion is associated with the bottom surface of the first jacket layer such that the core layer and the first jacket layer define a transversely extending groove between adjacent teeth of the first plurality of teeth that is void of material.

Clause 4. The composite elevator belt of any of clauses 1 to 3, further comprising: a second plurality of teeth extending transversely across a bottom surface of the core layer, the second plurality of teeth comprising a root portion associated with the core layer and a tip portion; and a second jacket layer extending in the longitudinal direction, at least the tip portion of the second plurality of teeth associated with a top surface of the second jacket layer.

Clause 5. The composite elevator belt of any of clauses 1 to 4, wherein each of the second plurality of teeth extends transversely across the bottom surface of the core layer in a direction not parallel to the longitudinal direction.

Clause 6. The composite elevator belt of any of clauses 1 to 5, wherein the first plurality of teeth is a mirror image of the second plurality of teeth reflected about the core layer in the longitudinal direction.

Clause 7. The composite elevator belt of any of clauses 1 to 6, wherein the first plurality of teeth is offset along the longitudinal direction relative to the second plurality of teeth.

Clause 8. The composite elevator belt of any of clauses 1 to 7, wherein each of the first plurality of teeth has a polygonal-shaped profile in a cross section perpendicular to the longitudinal direction, wherein the polygonal-shaped profile comprises one or more of trapezoidal-shaped, parallelogram-shaped, triangle-shaped, and pentagonal-shaped.

Clause 9. The composite elevator belt of any of clauses 1 to 8, wherein the core layer and the first jacket layer are of varying composition.

Clause 10. The composite elevator belt of any of clauses 1 to 9, wherein each of the first plurality of teeth has a rounded profile in a cross section perpendicular to the longitudinal direction, the rounded profile comprising one or more of semicircular-shaped, arcuate-shaped, elliptical-shaped, oval-shaped, and hemispherical-shaped.

Clause 11. The composite elevator belt of any of clauses 1 to 10, wherein the teeth of the first plurality of teeth vary in profile along the length of the composite elevator belt.

Clause 12. The composite elevator belt of any of clauses 1 to 11, wherein the teeth of the first plurality of teeth are integrally formed with the core layer.

Clause 13. The composite elevator belt of any of clauses 1 to 12, wherein the teeth of the first plurality of teeth are integrally formed with the first jacket layer.

Clause 14. The composite elevator belt of any of clauses 1 to 13, wherein the at least one strand is formed of an electrically conductive material.

Clause 15. The composite elevator belt of any of clauses 1 to 14, wherein a pitch of the first plurality of teeth varies over the length of the belt.

Clause 16. An elevator system, comprising: an elevator shaft having a support frame; an elevator car movable along a vertical travel path defined by the elevator shaft; a motor arrangement comprising at least one drive sheave rotatable via the motor arrangement; at least one elevator sheave connected to one of the elevator car and the support frame; and at least one composite elevator belt in frictional tractive engagement with the drive sheave of the motor arrangement and the at least one elevator sheave, the at least one composite elevator belt comprising: at least one load carrier strand extending in a longitudinal direction; a core layer encasing the at least one load carrier strand; a first plurality of teeth extending transversely across a top surface of the core layer, the first plurality of teeth comprising a root portion associated with the core layer and a tip portion; and a first jacket layer extending in the longitudinal direction, at least the tip portion of the first plurality of teeth being associated with a bottom surface of the first jacket layer.

Clause 17. The elevator system of clause 16, wherein each of the first plurality of teeth of the at least one composite elevator belt extends transversely across the top surface of the core layer in a direction not parallel to the longitudinal direction.

Clause 18. The elevator system of clause 16 or 17, wherein the tip portion of the first plurality of teeth of the at least one composite elevator belt is associated with the bottom surface of the first jacket layer such that the core layer and the first jacket layer define a transversely extending groove between adjacent teeth of the first plurality of teeth that is void of material.

Clause 19. The elevator system of any of clauses 16 to 18, wherein the at least one composite elevator belt further comprises: a second plurality of teeth extending transversely across a bottom surface of the core layer, the second plurality of teeth comprising a root portion associated with the core layer and a tip portion; and a second jacket layer extending in the longitudinal direction, at least the tip portion of the second plurality of teeth associated with a top surface of the second jacket layer.

Clause 20. The elevator system of any of clauses 16 to 19, wherein each of the second plurality of teeth of the at least one composite elevator belt extends transversely across the bottom surface of the core layer in a direction not parallel to the longitudinal direction.

These and other features and characteristics of composite elevator belts, as well as the methods of operation and functions of the related elements of an elevator system, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and claims, the singular forms of "a", "an", and "the" include plural referents unless the context clearly dictates otherwise.

DETAILED DESCRIPTION OF THE INVENTION

Figure 1:
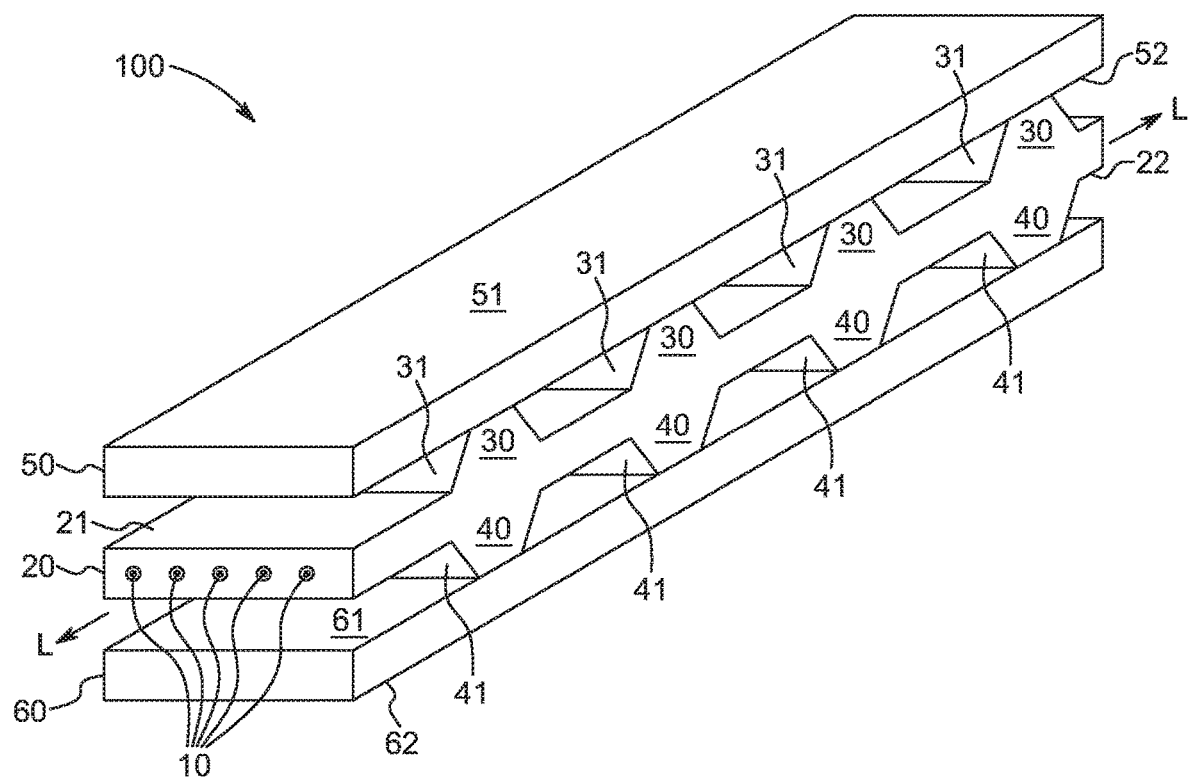
FIG. 1 is a perspective view of a section of a composite elevator belt according to one embodiment of the present disclosure.

For purposes of the description hereinafter, the terms "upper", "lower", "right", "left", "vertical", "horizontal", "top", "bottom", "lateral", "longitudinal", and derivatives thereof, shall relate to the disclosed apparatus as it is oriented in the figures. However, it is to be understood that the apparatus of the present disclosure may assume alternative variations and step sequences, except where expressly specified to the contrary. It is also to be understood that the specific systems and processes illustrated in the attached drawings and described in the following specification are simply exemplary examples of the apparatus disclosed herein. Hence, specific dimensions and other physical characteristics related to the examples disclosed herein are not to be considered as limiting.

As used herein, the terms "sheave" and "pulley" are used interchangeably to describe a wheel for tractive connection to a tension member of any type. It is to be understood that a "pulley" is encompassed by the recitation of a "sheave", and vice versa, unless explicitly stated to the contrary.

As used herein, the term "supplementary", when used to refer to a pair of angles, means a pair of angles whose sum is 180°. As used herein, the term "complementary", when used to refer to a pair of angles, means a pair of angles whose sum is 90°.

As used herein, the term "substantially parallel to" means within plus or minus 5° of parallel unless explicitly indicated to the contrary. As used herein, the term "substantially perpendicular to" means within plus or minus 5° of perpendicular unless specifically indicated to the contrary.

As used herein, the terms "transverse", "transverse to", and "transversely to" a given direction mean not parallel to that given direction. Thus, the terms "transverse", "transverse to", and "transversely to" a given direction encompass directions perpendicular to, substantially perpendicular to, and otherwise not parallel to the given direction.

As used herein, the term "associated with", when used in reference to multiple features or structures, means that the multiple features or structures are in contact with, touching, directly connected to, indirectly connected to, adhered to, or integrally formed with one another.

Referring to the drawings in which like reference numerals refer to like parts throughout the several views thereof, the present disclosure is generally directed to a composite elevator belt for use in an elevator system to raise and lower an elevator car. It is to be understood, however, that the composite belt described herein may be used in many different applications in which tension members are utilized in traction with sheaves. The present disclosure is also directed to an elevator system utilizing the composite elevator belt. Further, the present disclosure is directed to methods and apparatuses for making the composite elevator belt.

FIG. 1 illustrates a portion of a composite elevator belt 100 according to one embodiment of the present disclosure. The composite elevator belt 100 includes at least one fiber or strand 10 encased in a core layer 20 and extending in a longitudinal direction L of the composite elevator belt 100 to form a load carrier. The at least one fiber or strand 10 may be continuous along the length of the composite elevator belt 100, or the at least one fiber or strand 10 may be interrupted or entangled with other strands 10. A first plurality of teeth 30 is disposed on a top surface 21 of the core layer 20 and extends outwardly therefrom. As shown, for example, in FIG. 4A, each of the first plurality of teeth 30 has a root portion 32 associated with the core layer 20 and a tip portion 33 extending from the root portion 32 away from the core layer 20. Each of the first plurality of teeth 30 further includes a pair of flank surfaces 31 extending along the top surface 21 of the core layer 20 in a direction not parallel to and, in some embodiments, substantially perpendicular to the longitudinal direction L. The space between adjacent teeth 30 form grooves associated with top surface 21 the core layer 20. Similarly, a second plurality of teeth 40 is disposed on a bottom surface 22 of the core layer 20 and extends outwardly therefrom. As shown, for example, in FIG. 4A, each of the second plurality of teeth 40 has a root portion 42 associated with the core layer 20 and a tip portion 43 extending from the root portion 42 away from the core layer 20. Each of the second plurality of teeth 40 has a pair of flank surfaces 41 extending along the bottom surface 22 of the core layer 20 in a direction not parallel to and, in some embodiments, substantially perpendicular to the longitudinal direction L. The space between adjacent teeth 40 form grooves associated with bottom surface 22 the core. Together, the strands 10, core layer 20, and first and second pluralities of teeth 30, 40 define the load carrier that carries tension in the longitudinal direction L when the composite elevator belt 100 is in operation supporting a component of an elevator system 1000 (see FIG. 8).

Figure 2:
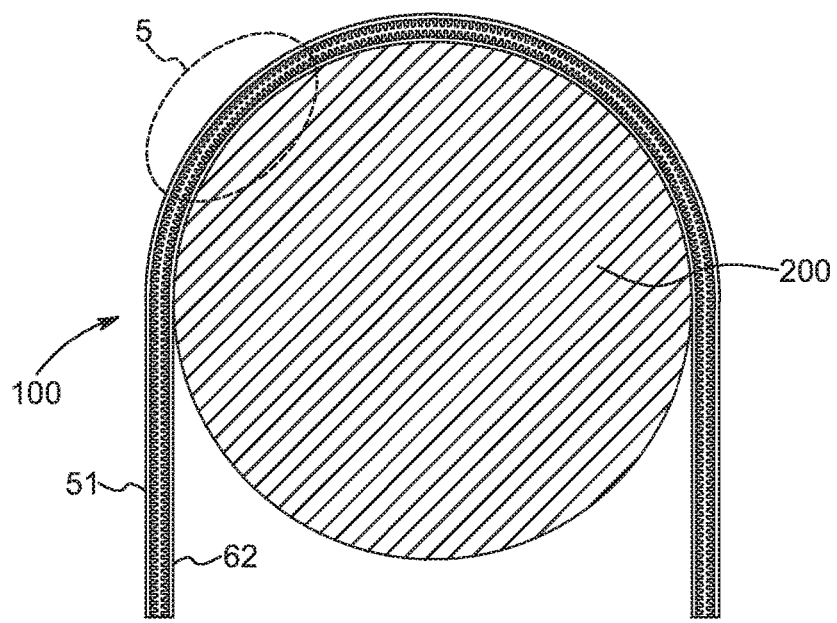
FIG. 2 is a side view of the composite elevator belt of FIG. 1 engaging a sheave.
Figure 3:
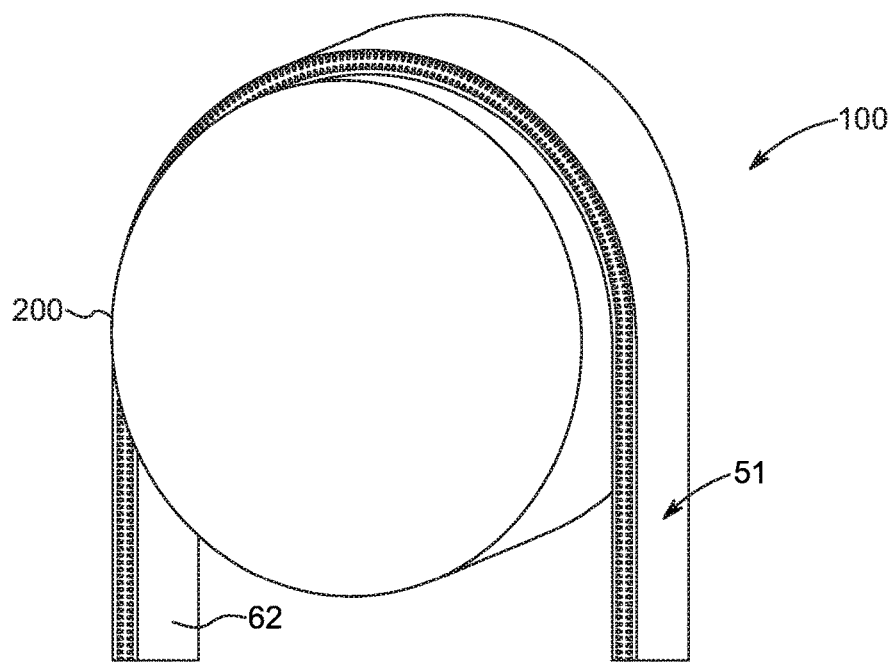
FIG. 3 is a side perspective view of the composite elevator belt and sheave of FIG. 2.

A first jacket layer 50 is provided and extends parallel to the core layer 20 in the longitudinal direction L. The first jacket layer 50 is spaced apart from the core layer 20 by the first plurality of teeth 30 and is associated with the tip portions 33 of each of the first plurality of teeth 30. Between each adjacent pair of the first plurality of teeth 30, a transverse groove is defined by the top surface 21 of the core layer 20, a bottom surface 52 of the first jacket layer 50, and the flanks 31 of the adjacent teeth 30. Similarly, a second jacket layer 60 is provided and extends parallel to the core layer 20 in the longitudinal direction L. The second jacket layer 60 is spaced apart from the core layer 20 by the second plurality of teeth 40 and is associated with the tip portions 43 of each of the second plurality of teeth 40. Between each adjacent pair of the second plurality of teeth 40, a transverse groove is defined by the bottom surface 22 of the core layer 20, a top surface 61 of the second jacket layer 60, and the flanks 41 of the adjacent teeth 40. These transverse grooves are void of core layer 20 and jacket layer 50, 60 material. A top surface 51 of the first jacket layer 50 and a bottom surface 62 of the second jacket layer 60 define contact surfaces of the composite elevator belt 100 and are configured for tractive, frictional engagement with a running surface of a sheave 200, as shown in FIGS. 2-3.

Figure 4A:
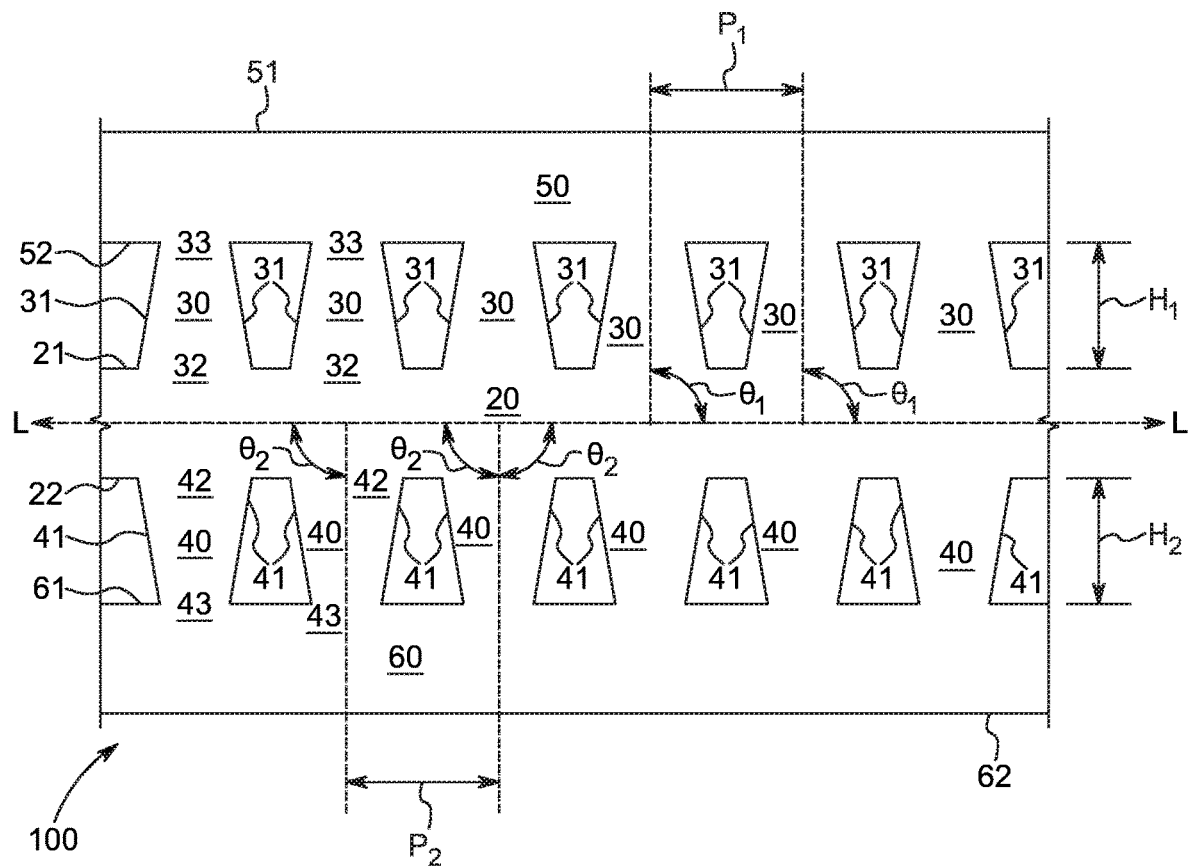
FIG. 4A is a side view of the section of the composite elevator belt of FIG. 1.

With continued reference to FIG. 4A, each of the first plurality of teeth 30 extends at a tooth angle $\Theta_1$ relative to the longitudinal direction L Likewise, each of the second plurality of teeth 40 extends at a tooth angle $\Theta_2$ relative to the longitudinal direction L. The tooth angles $\Theta_1$, $\Theta_2$ of the first and second pluralities of teeth 30, 40 may be the same or different depending on the application of the composite elevator belt 100, as will be described in greater detail below. In some embodiments, the tooth angles $\Theta_1$, $\Theta_2$ of the first and second pluralities of teeth 30, 40 may vary along the length of the composite elevator belt 100.

Each of the first plurality of teeth 30 are spaced apart from adjacent teeth 30 by a pitch $P_1$. Likewise, each of the second plurality of teeth 40 are spaced apart from adjacent teeth 40 by a pitch $P_2$. The pitch $P_1$ of the first plurality of teeth 30 may be the same or different than the pitch $P_2$ of the second plurality of teeth 40, and the pitches $P_1$, $P_2$ may vary along the length of the composite elevator belt 100. Similarly, a height $H_1$ of the first plurality of teeth may be the same or different than a height $H_2$ of the second plurality of teeth 40.

Figure 4B:
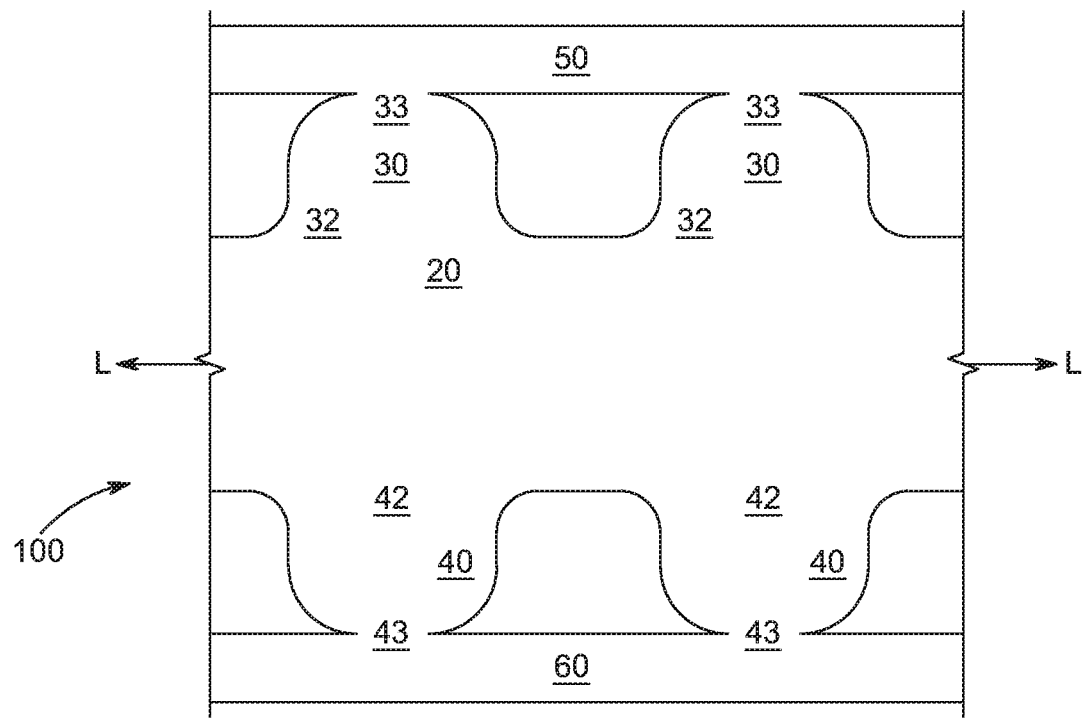
FIGS. 4B-4F are side views of a section of a composite elevator belt according to other embodiments of the present disclosure.
Figure 4C:
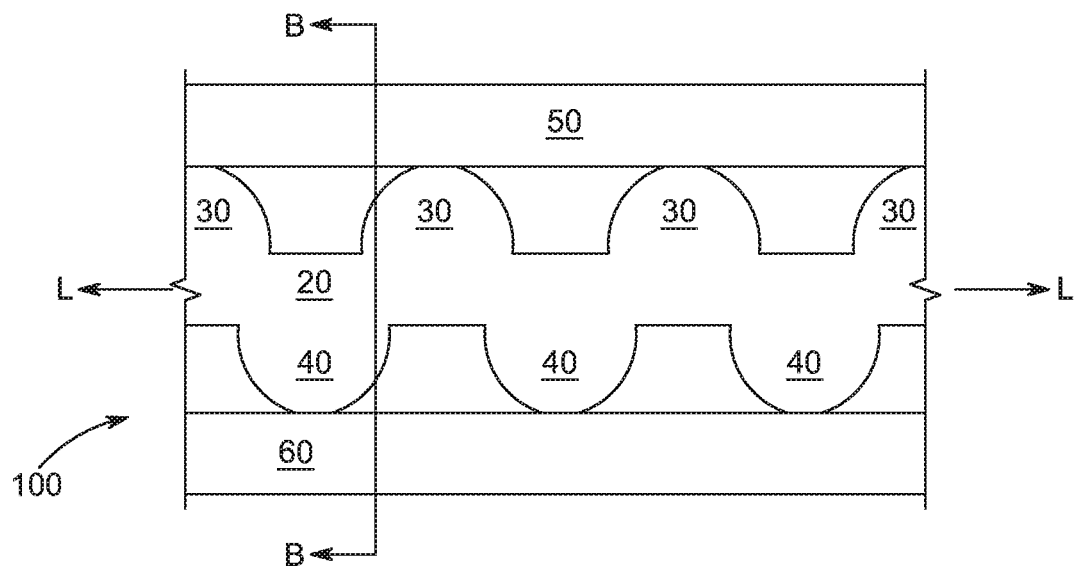

Each of the teeth 30, 40 may have a generally polygonal profile, such as a trapezoidal profile, when viewed in a cross section perpendicular to the longitudinal direction L, such that the root portions 32, 42 are wider than the tip portions 33, 43, or vice versa. As shown in the embodiment of FIG. 2, the profile and arrangement of the first plurality of teeth 30 may be a mirror image of the profile and arrangement of the second plurality of teeth 40. That is, the profile and arrangement of the first plurality of teeth 30 may be symmetrical to the profile and arrangement of the second plurality of teeth 40 when reflected about a plane parallel to the longitudinal direction L. In other embodiments, the polygonal profile of each of the teeth 30, 40 may be a triangular profile, a parallelogram profile, or a pentagonal profile. Further embodiments of the teeth 30, 40 are illustrated in FIGS. 4B-4F, although it is to be understood that the embodiments shown in the various drawings are merely exemplary and do not represent an exhaustive set of embodiments within the scope of the present disclosure. As shown in FIGS. 4B-4C, the each of the teeth 30, 40 may have a generally rounded profile when viewed in a cross section perpendicular to the longitudinal direction, such as a semicircular, arcuate, elliptical, oval, or hemispherical profile.

Figure 4D:
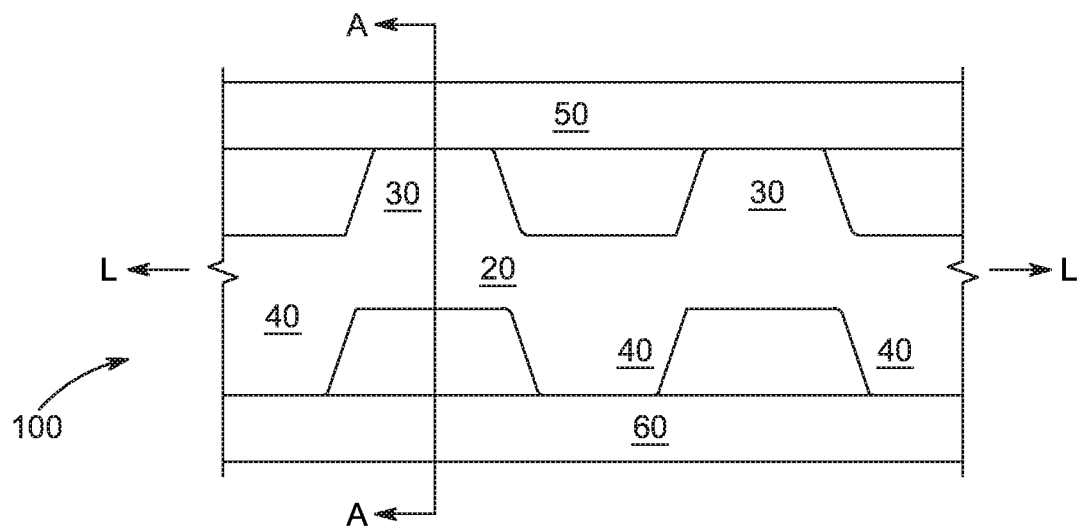
Figure 4E:
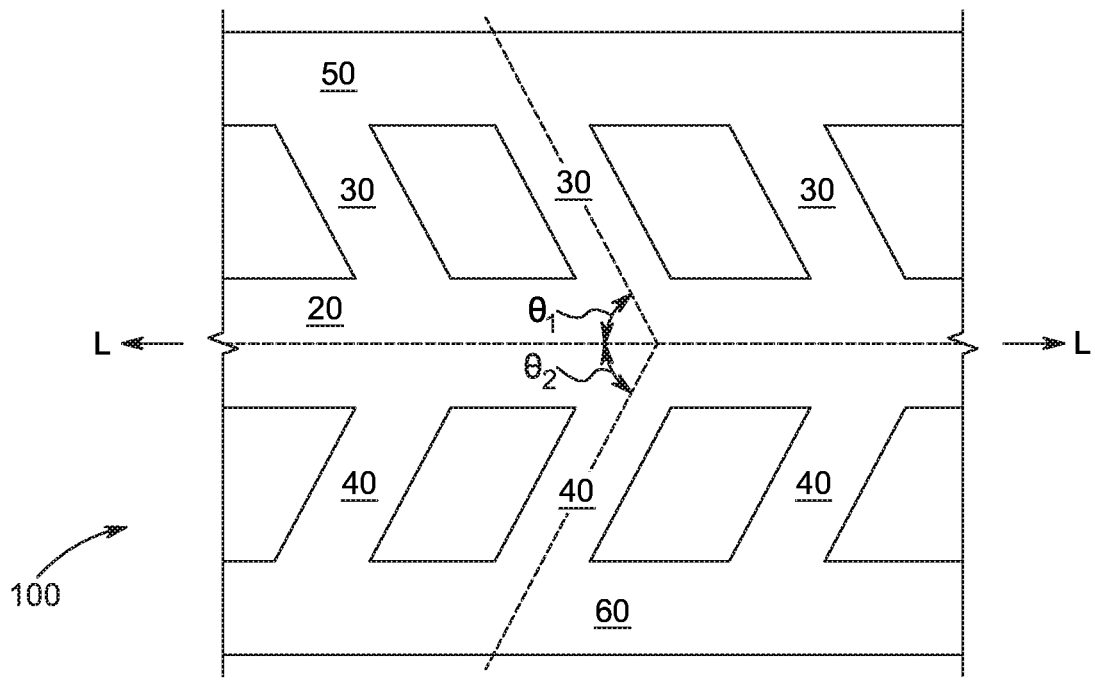
Figure 4F:
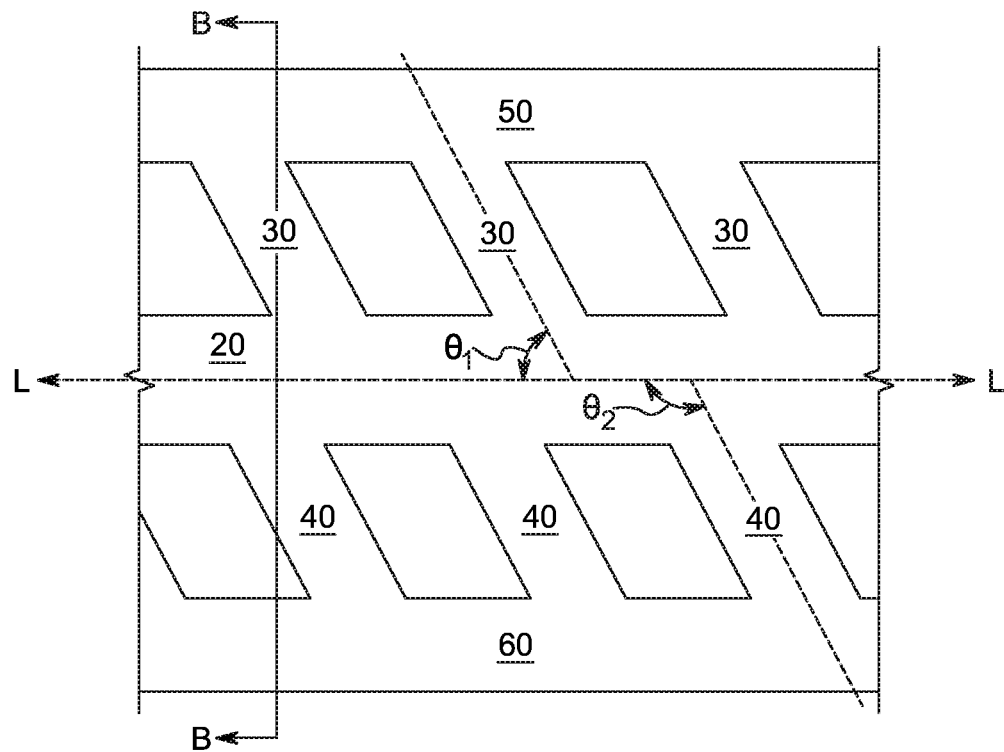

FIG. 4D illustrates an embodiment having trapezoidal teeth 30, 40 similar to FIG. 4A, except that the teeth of the second plurality of teeth 40 are staggered or offset along the longitudinal direction L relative to those of the first plurality of teeth 30. That is, a cross section AA of the composite elevator belt 100 taken perpendicular to the longitudinal direction L intersects one of the first plurality of teeth 30 but none of the second plurality of teeth 40. In other embodiments of the composite elevator belt 100 shown in FIGS. 4E-4F, each of the teeth 30, 40 may have a parallelogram-shaped profile. The tooth angles $\Theta_1$, $\Theta_2$ of the first and second pluralities of teeth 30, 40 may be equal as shown in FIG. 4E, supplementary as shown in FIG. 4F, or neither. Again, it is to be understood that the embodiments of teeth 30, 40 illustrated in the drawings are merely exemplary, and that the teeth 30, 40 may have a profile of any polygonal or rounded shape. Additionally, it is to be understood that the teeth of the first plurality of teeth 30 and the second plurality of teeth 40 need not share the same profile. For example, some of the teeth of the first plurality of teeth 30 may have a polygonal profile while others of the first plurality of teeth 30 may have a rounded profile. Similarly, some of the teeth of the second plurality of teeth 40 may have a polygonal profile while others of the second plurality of teeth 40 may have a rounded profile.

Referring back to FIG. 4C, some embodiments of the composite elevator belt 100 may include first and second pluralities of teeth 30, 40 which are staggered or offset relative to one another, and are also overlapping. That is, a cross section BB of the composite elevator belt 100 taken perpendicular to the longitudinal direction L intersects one of the teeth of the first plurality of teeth 30 and one of the teeth of the second plurality of teeth 40, even though the teeth of the first and second pluralities of teeth 30, 40 are not symmetrical about the longitudinal direction L. Again, it is to be understood that embodiments of teeth 30, 40 illustrated in the drawings are merely exemplary, and that any stagger, offset, overlap, and other spatial relationship between the teeth 30, 40, including combinations thereof, are to be considered within the scope of the present disclosure.

In some embodiments, the profiles and arrangement of the first and second pluralities of teeth 30, 40 may be different at certain sections of the composite elevator belt 100 to account for differing load conditions experienced along the length of the composite elevator belt 100. As will be explained in greater detail below, the profile and arrangement of the teeth 30, 40 affects the compressive and tensile loads experienced by the core layer 20 and the strands 10 of the composite elevator belt 100. It may therefore be advantageous to shape and space the teeth 30, 40 in anticipation of the compressive and tensile loads expected in specific sections of the composite elevator belt 100. For example, some sections of the composite elevator belt 100 may only engage the sheave 200 during a small fraction of the total load cycles of composite elevator belt 100. These sections of the composite elevator belt 100 therefore experience less flexing cycles from sheave engagement than other sections of the composite elevator belt 100 which engage the sheave 200 during a larger fraction of the total load cycles. Accordingly, different tooth profiles and spacing may be utilized to optimize the life of the composite elevator belt 100 and to equalize wear and fatigue across various sections of the composite elevator belt 100 based on the differing load conditions experienced by the various sections of the composite elevator belt 100.

In still other embodiments, the profile and/or arrangement of the first plurality of teeth 30 may be different than the profile and/or arrangement of the second plurality of teeth 40 along the entire length of the composite elevator belt 100 or at certain sections of the composite elevator belt 100 to account for different loading conditions on opposite surfaces of the composite elevator belt 100. For example, at certain sections of the composite elevator belt 100, the first jacket layer 50 may engage the sheave 200 but the second jacket layer 60 may not. In these sections of the composite elevator belt 100, the first plurality of teeth 30 associated with the first jacket layer 50 may have a profile and/or arrangement advantageous for compressive loading due to sheave engagement, while the second plurality of teeth 40 associated with the second jacket layer 60 may have a different profile and/or arrangement advantageous for tensile loading. Conversely, at other sections of the composite elevator belt 100, the second jacket layer 60 may engage another sheave 200 but the first jacket layer 50 may not. In these sections of the composite elevator belt 100, the second plurality of teeth 40 associated with the second jacket layer 60 may have a profile and/or arrangement advantageous for compressive loading due to sheave engagement, while the first plurality of teeth 30 associated with the first jacket layer 50 may have a different profile and/or arrangement advantageous for tensile loading.

Still other embodiments of composite elevator belts 100 according to the present disclosure will be described later with reference to FIGS. 13A-13D and 14A-14L, after additional details of the previously described embodiments, as well as apparatuses and methods for the making thereof, are described.

Figure 5:
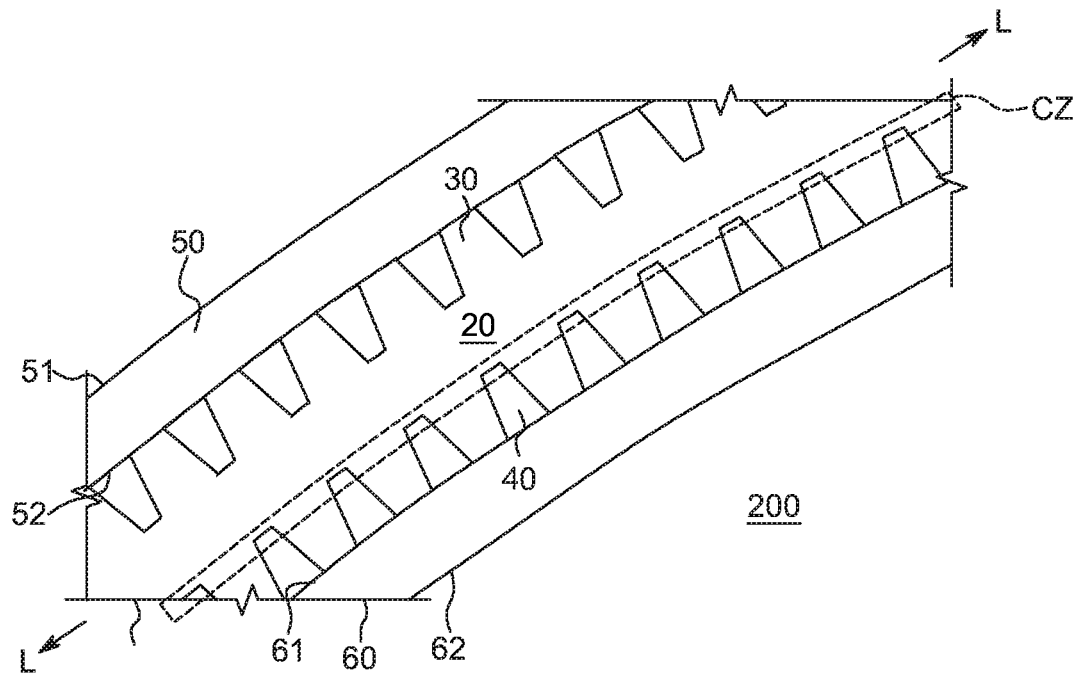
FIG. 5 is a detail view of a portion of the composite elevator belt of FIG. 2.

FIG. 5 shows a detail of FIG. 2, illustrating the composite elevator belt 100 deforming around a curved running surface of the sheave 200. Particularly, the composite elevator belt 100 deforms along the longitudinal direction L such that a portion of the composite elevator belt 100 farthest from a rotational axis of the sheave 200 becomes longer in the longitudinal direction L than a portion of the composite elevator belt 100 in contact with the running surface of the sheave 200. In the embodiment shown, the top surface 51 of the first jacket layer 50 becomes longer in the longitudinal direction L than the bottom surface 62 of the second jacket layer 60. Due to this deformation of the composite elevator belt 100, compression loads propagate in a compression zone CZ defined by the bottom surface 22 of the core layer 20 and extending towards the top surface 21 of the core layer 20 perpendicular to the longitudinal direction L.

Figure 6:
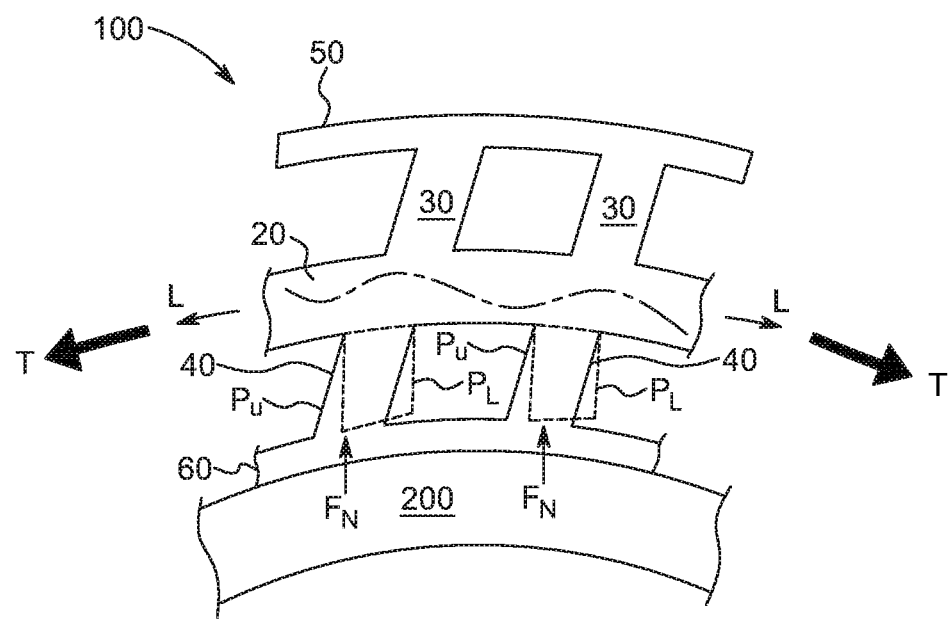
FIG. 6 is a load diagram showing the loads and deformation experienced by a section of the composite elevator belt during use.

FIG. 6 is a diagram showing the loads and deformation experienced by one embodiment of the composite elevator belt 100 when the second jacket layer 60 engages the sheave 200. A frictional tractive force between the second jacket layer 60 and the sheave 200 places a load on the second jacket layer 60 in a direction opposite a tension load T, such as the weight of an elevator car, applied to the composite elevator belt 100. As such, the second jacket layer 60 is translated relative to the core layer 20 in the longitudinal direction L, causing the second plurality of teeth 40 to deform from an unloaded position $P_U$, shown in solid line, to a loaded position $P_L$, shown in dashed line.

Moreover, deformation of the composite elevator belt 100 around the sheave 200 causes each of the second plurality of teeth 40 to exert a normal force $F_N$ against the core layer 20. As explained above with reference to FIG. 5, the core layer 20 and strands 10 are subject to compression loads in the compression zone CZ defined from the bottom surface 22 of the core layer 20 and extending toward the top layer 21 of the core layer 20. The normal forces $F_N$ exerted by the second plurality of teeth 40 against the core layer 20 causes deformation of the core layer 20 and the strands 10 in the direction of the normal forces $F_N$. Such deformation is shown by wavy dot-dash-dot lines in the core layer 20 of FIG. 6. The dot-dash-dot lines indicating deformation are exaggerated to clearly show the nature of deformation of the core layer 20 and the strands 10. Deformation of the core layer 20 and the strands 10 relieves some or all of the compressive loads experienced by the composite elevator belt 100 in the compression zone CZ by converting some of the internal compression loads into deformation. Reduction of the compressive loads in the compression zone CZ consequently allows the composite elevator belt 100 to attain a tighter bend radius without exceeding the maximum allowable internal compression loads. As such, the minimum bend radius of the composite elevator belt 100 is reduced.

Figure 7:
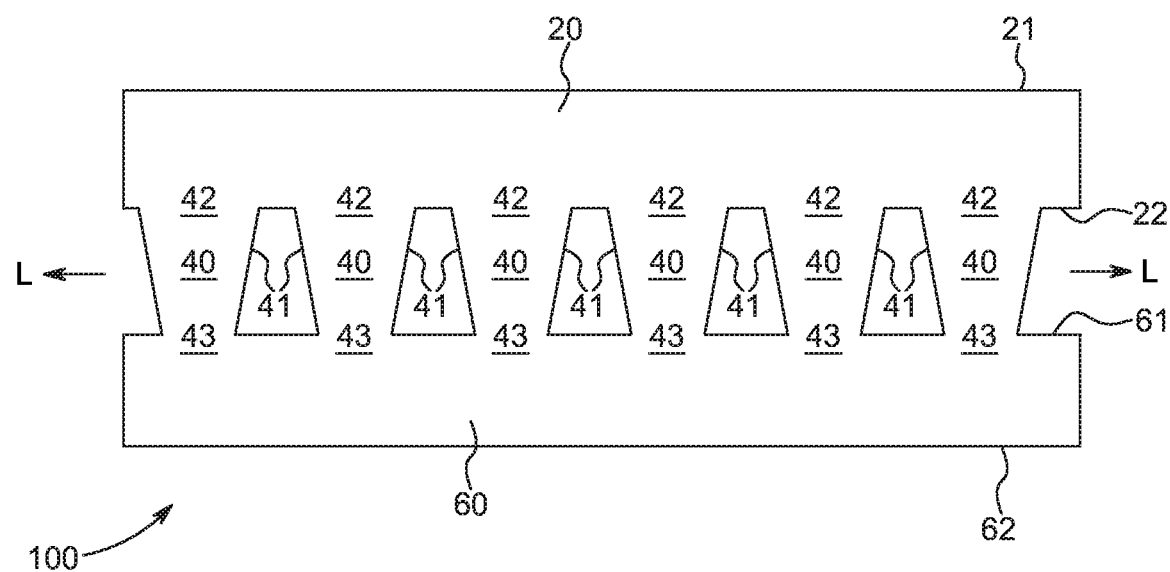
FIG. 7 is a side view of a section of a composite elevator belt according to another embodiment of the present disclosure.

The foregoing descriptions of FIGS. 1-6 describe embodiments of the composite elevator belt 100 for applications in which both sides of the composite elevator belt 100 are configured to engage a running surface of one or more sheaves 200. That is, both the top surface 51 of the first jacket layer 50 and the bottom surface 62 of the second jacket layer 60 contact one or more sheaves 200 during operation of the composite elevator belt 100. Examples of such applications include elevators utilizing a two-to-one (2:1) roping arrangement in which one side of the composite elevator belt 100 engages a sheave 200 coupled to a drive motor and the opposite side of the composite elevator belt 100 engages a sheave 200 coupled to a counterweight or elevator car. Referring now to FIG. 7, other embodiments of the composite elevator belt 100 are adapted for applications in which only one side of the composite elevator belt 100 will contact the one or more sheaves 200. Examples of such applications include elevators utilizing a one-to-one (1:1) roping arrangement in which the composite elevator belt 100 engages only a sheave 200 coupled to a drive motor. Other examples of such applications include elevators utilizing a two-to-one (2:1) roping arrangement, but in which the same side of the composite elevator belt 100 engages both the sheave 200 coupled to the drive motor and the sheave 200 coupled to a counterweight or elevator car.

As shown in FIG. 7, a composite elevator belt 100 for applications in which only one side of the composite elevator belt 100 will contact the sheaves 200 may be substantially the same as the composite elevator belt 100 described with reference to FIGS. 1-6, except that only a single plurality of teeth 40 and a single jacket layer 60 are included. In this embodiment, the single jacket layer 60 is the only portion of the composite elevator belt 100 that engages one or more sheaves 200 of the elevator.

Figure 8:
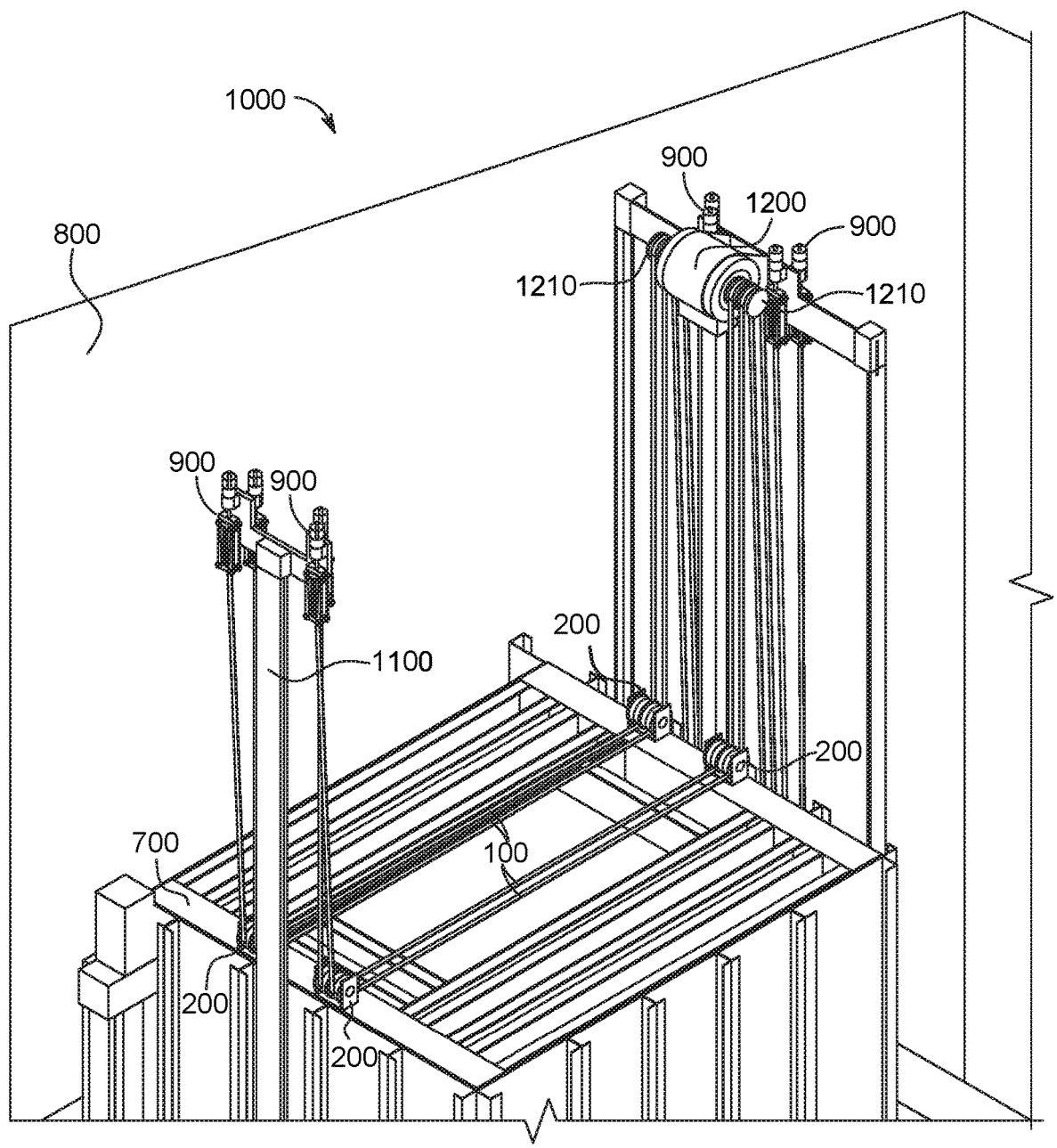
FIG. 8 is a perspective view of an elevator system utilizing a composite elevator belt according to an embodiment of the present disclosure.

Referring now to FIG. 8, other embodiments of the present disclosure are directed to an elevator system 1000 utilizing at least one composite elevator belt 100 described with reference to FIGS. 1-7. The elevator system 1000 may include an elevator car 700 and counterweight (not shown) movable along a vertical travel path defined by an elevator shaft 800 using a plurality of composite elevator belts 100 that raise and/or lower the elevator car 700. In the embodiment shown in FIG. 8, the elevator system 1000 includes four composite elevator belts 100 configured to move the elevator car 700 and a counterweight within the elevator shaft 800. Each end of each composite elevator belt 100 may be held in a separate end termination 900 affixed to a stationary or movable component of the elevator system 1000, such as a support frame 1100, the elevator car 700, or any other load supporting component of the elevator system 1000. The composite elevator belts 100 may be routed around any number of elevator sheaves 200 to alter the direction of the tension force applied by the composite elevator belts 100 on the elevator car 700 and the counterweight. The elevator sheaves 200 may be attached to any portion of the elevator system 1000 including the support frame 1100, the elevator car 700, and/or the counterweight to redirect the pulling force of the composite elevator belts 100 according to the design of the elevator system 1000. The composite elevator belts 100 are further routed around drive sheaves 1210 rotatable by at least one motor arrangement 1200. The drive sheaves 1210 frictionally engage the composite elevator belts 100 between opposing ends of the composite elevator belts 100 such that rotation of the drive sheaves 1210 increases or decreases the length of the composite elevator belts 100 between a first end the of the composite elevator belt 100 and the motor arrangement 1200. Rotation of the drive sheaves 1210 thus causes the elevator car 700 to raise or lower depending on the direction of rotation of the drive sheaves 1210 and the arrangement of the counterweight, end terminations 900, and elevator sheaves 200.

Having described the structure and function of the composite elevator belt 100, one skilled in the art will appreciate that a variety of materials may lend themselves to use for the various components thereof. Examples of suitable materials will be generally described below and are further discussed in U.S. patent application Ser. No. 13/092,391, published as U.S. Patent Application Publication No. 2011/0259677, the entirety of which is incorporated by reference herein. Materials may be selected for their advantageous mechanical properties as well as for their compatibility with manufacturing methods suitable for making the composite elevator belt 100. Examples of such manufacturing methods will be subsequently be described with reference to FIGS. 9-12.

The at least one fiber or strand 10 may be made from a variety of natural and synthetic materials which are flexible yet exhibit a high breaking strength. Suitable materials for the at least one fiber or strand 10 thus include glass fiber, aramid fiber, carbon fiber, nylon fiber, metallic cable, and/or combinations thereof. As will be described below, some methods of manufacturing the composite elevator belt 100 utilize inductive heating of the strands 10. In such embodiments, it is advantageous that the material of the fiber or strand 10 is electrically conductive. In some embodiments, each of the strands 10 may be continuous along the longitudinal direction L over the entire length of the composite elevator belt 100. In other embodiments, the strands 10 may be interrupted along the longitudinal direction L, and may or may not overlap one another. In still other embodiments, the strands 10 may be entangled or stranded with one another along the length of the composite elevator belt 100. In some embodiments, the strands 10 may be arranged in multiple layers in a direction perpendicular to the longitudinal direction L.

The core layer 20 may be made of a polymer matrix material, such as a curable resin, suitable for deposition on the strands 10 and flexible when cured. The material of the core layer 20 may be selected based on its curing properties such as the curing rate and the responsiveness of the curing rate to heat. As such, the speed of the curing process of the core layer 20 and the overall production rate of the composite elevator belt 100 may be increased by various heating devices as will be described below. Some methods of manufacturing the composite elevator belt 100 utilize inductive heating of the core layer 20. In such embodiments, it is advantageous that the material of the core layer 20 is inherently electrically conductive or is mixed with an electrically conductive additive.

The first and second jacket layers 50, 60 may be made of a polymer material selected for flexibility and to promote friction with the sheave 200. Additionally, the material of the first and second jacket layers 50, 60 may be selected for wear resistance of the first and second jacket layers 50, 60 and/or to prevent galling and other damage to the sheave 200. Suitable materials for the first and second jacket layers 50, 60 thus include curable resins such as urethanes, in particular thermoplastic polyurethane (TPU). The material of the first and second jacket layers 50, 60 may be softer than the material of the core layer 20 by, for example, a factor of ten.

The first and second pluralities of teeth 30, 40 may be made of a polymer material having sufficient stiffness and rigidity to deform the core layer 20 as described above with reference to FIG. 6. Additionally, the material of the first and second pluralities of teeth 30, 40 should have sufficient stiffness and rigidity so as not to collapse due the shearing load between the core layer 20 and the first and second jacket layers 50, 60 when the composite elevator belt 100 wraps around the sheave 200. In some methods of manufacturing the composite elevator belt 100, the first and second pluralities of teeth 30, 40 may be made during the same process and using the same material as the core layer 20. In other methods of manufacturing the composite elevator belt 100, the first and second pluralities of teeth 30, 40 may be made during the same process and using the same material as the first and second jacket layers 50, 60.

Figure 9:
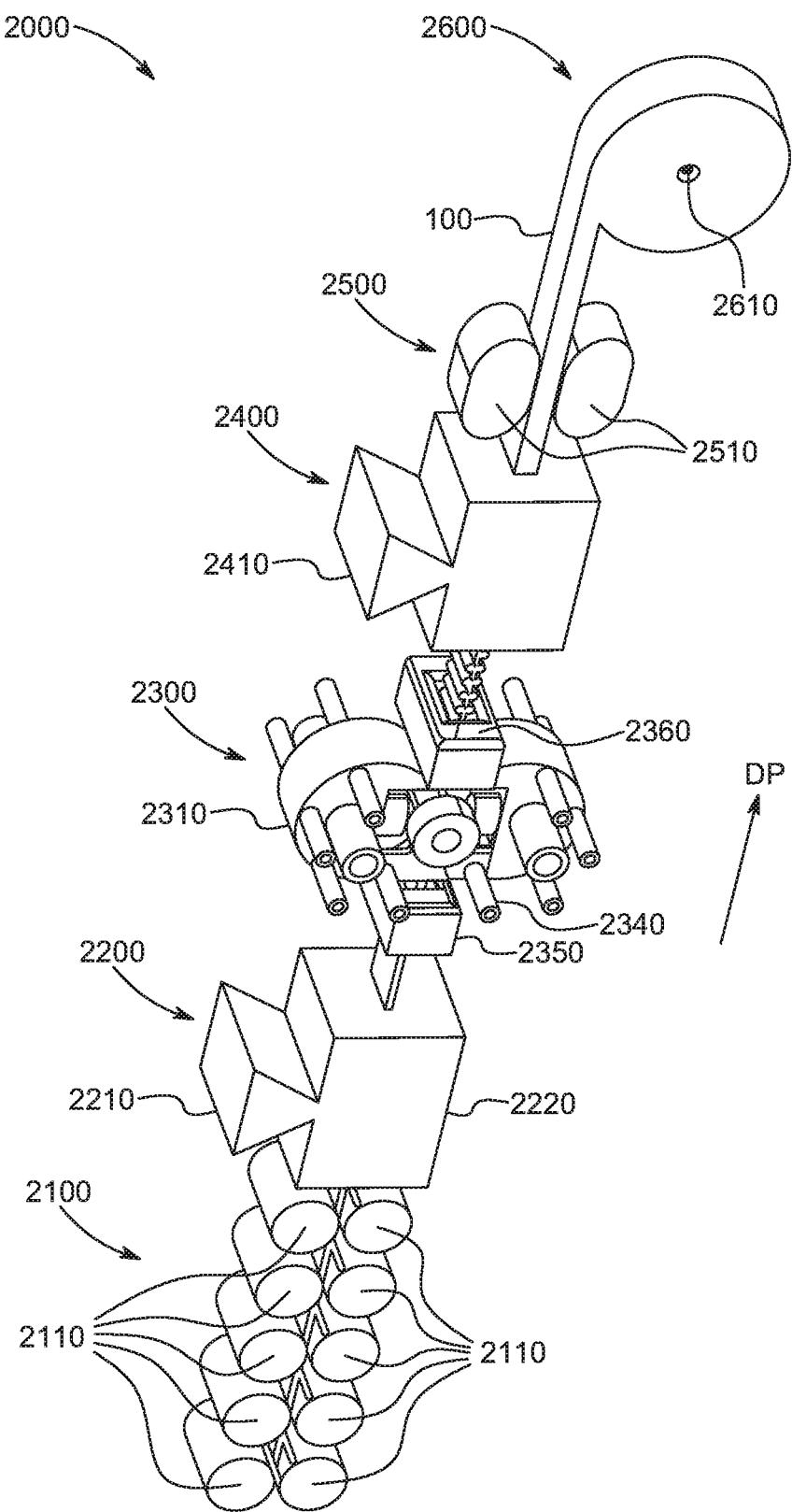
FIG. 9 is a perspective view of a manufacturing apparatus for making a composite elevator belt according to the present disclosure.

Embodiments of the composite elevator belt 100 described herein are particularly suited for manufacturing via a pultrusion process. FIG. 9 illustrates a manufacturing apparatus 2000 for making the composite elevator belt 100. Production of the composite elevator belt 100 proceeds in the pulling direction DP through the components of the manufacturing apparatus 2000. The general components of the manufacturing apparatus 2000 include a roving spool rack 2100, a core impregnator 2200, a pultrusion die 2300, a jacket extruder 2400, a tractor 2500, and a spooler 2600. Each of these components of the manufacturing apparatus 2000 will first be individually described, followed by a description of a process for making the composite elevator belt 100 using the manufacturing apparatus 2000.

The roving spool rack 2100 includes one or more spools 2110 on which the strands 10 are wound. Each strand 10 of the composite elevator belt 100 may be associated with one of the spools 2110. The one or more spools 2110 may be free-spinning such that a tension force applied to free ends of the strands 10 causes the strands 10 to be unwound from the one or more spools 2110. In some embodiments, the one or more spools 2110 may be motorized to assist in the unwinding of the strands 10.

The core impregnator 2200 is configured to pre-form the core layer 20 onto the strands 10. The core impregnator 2200 includes an injector 2210 configured to supply the material that will form the core layer 20 to a bath chamber 2220 in a liquid phase. The bath chamber 2220 has openings at both ends along the pulling direction DP to allow the strands 10 to be pulled through the bath chamber 2200, coating the strands 10 in the core layer 20 material.

The pultrusion die 2300 is configured to finalize the encasing of the strands 10 with the core layer 20 and to apply the first and second pluralities of teeth 30, 40 to the core layer 20. The pultrusion die 2300 includes a housing 2310 enclosing one or more rotating dies 2320, 2321 (see FIGS. 10-11) and defining one or more resin chambers 2330, 2331 (see FIGS. 10-11) pressurized with a liquid phase of the material that will form the first and second pluralities of teeth 30, 40. Both ends of the housing 2310 along the pulling direction DP have openings to allow the partially formed composite elevator belt 100 to be pulled through the housing 2310. The pultrusion die 2300 further includes a central heating element 2340 configured to heat the strands 10, the core layer 20, and the teeth 30, 40 within the housing 2310. In some embodiments, the pultrusion die 2300 may further include an entry heating element 2350 and/or exit heating element 2360 to finely adjust the temperature the temperature of the partially formed composite elevator belt 100 entering and/or exiting the housing 2310.

Figure 10:
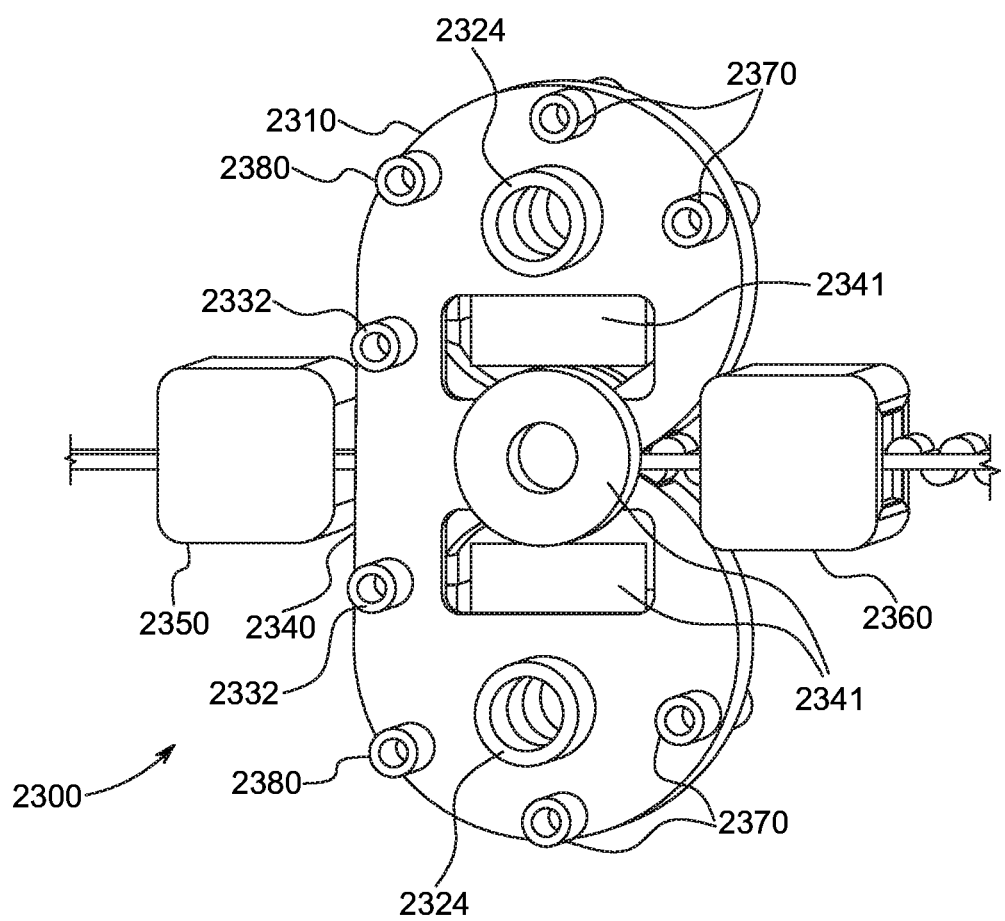
FIG. 10 is a side view of a pultrusion die of the manufacturing apparatus of FIG. 9 according to the present disclosure.
Figure 11:
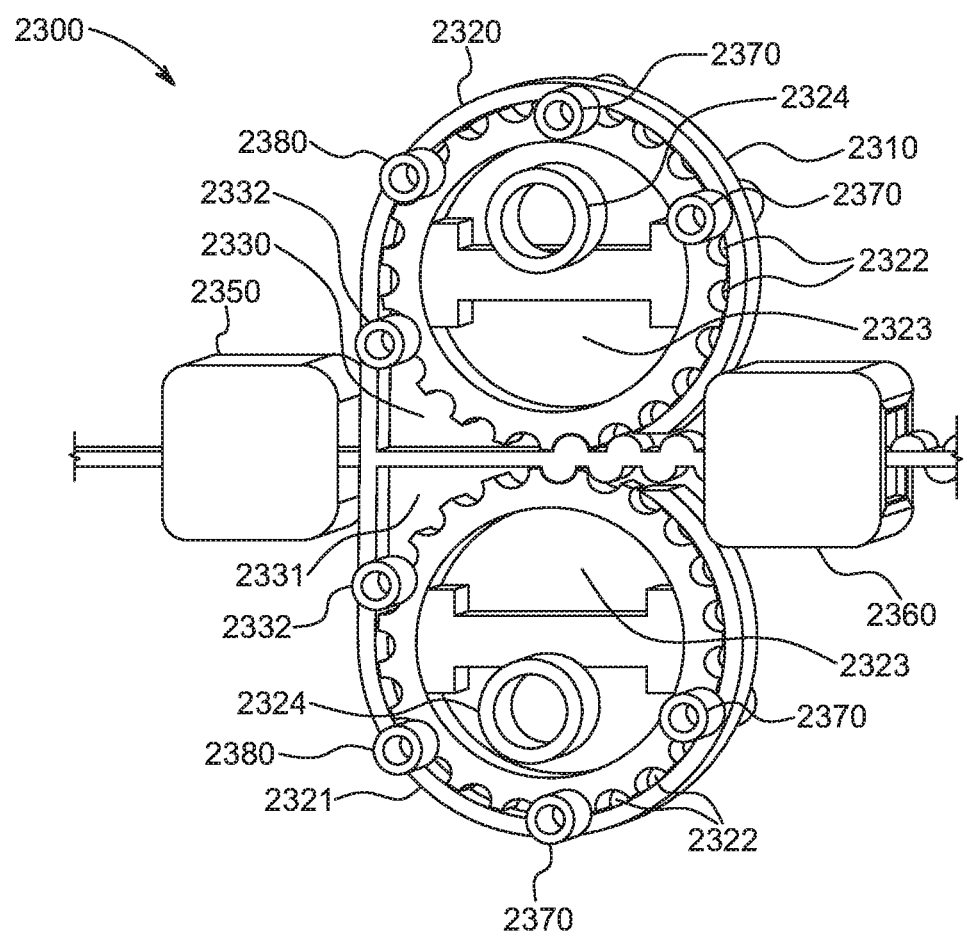
FIG. 11 is a schematic cross sectional view of the pultrusion die of FIG. 10.

Referring now to FIGS. 10-11, material is supplied to the resin chambers 2330, 2331 of pultrusion die 2300 via injection openings 2332 in the housing 2310. The pultrusion die 2300 includes the at least one rotating die 2320, 2321 inside the housing 2310 and adjacent to the resin chambers 2330, 2331. Each of the rotating dies 2320, 2321 has a plurality of molding teeth 2322, with the space between adjacent molding teeth 2322 defining a profile corresponding to the profile of the first and second pluralities of teeth 30, 40. The rotating dies 2320, 2321 are configured to rotate and apply pressure to the strands 10 coated with the core layer 20 material from the core impregnator 2200, thereby removing air bubbles and finalizing the profile of the core layer 20. Additionally, as the rotating dies 2320, 2321 rotate, material from the resin chambers 2330, 2331 fills the spaces between the molding teeth 2322 and is pressed onto the core layer 20 to form the first and second pluralities of teeth 30, 40. The molding teeth 2322 of each rotating die 2320, 2321 may have different profiles from one another so that the profiles of the formed first plurality of teeth 30 and/or the profiles of the second plurality of teeth 40 may vary along the length of the composite elevator belt 100.

The rotating dies 2320, 2321 of the pultrusion die 2300 may have hollow cross centers which serve as cooling chambers 2323. Fluid coolant may be circulated through the cooling chambers 2323 via coolant openings 2324 in the housing 2310 to regulate the temperature of the rotating dies 2320, 2321. Additionally, the housing 2310 may include one or more cleaning openings 2370 for providing cleaning agents to the rotating dies 2320, 2321. Moreover, the housing 2310 may include repellant openings 2380 for providing lubricants and other agents to prevent sticking and accumulation of the material in the resin chambers 2330, 2331 on the rotating dies 2320, 2321. The pultrusion die 2300 and the associated production process allows for be better control of belt quality via observation of the molding teeth 2322 of the rotating dies 2320, 2321 as the molding teeth 2322 apply resin to and disengage from the core layer 20. If it is observed that resin begins sticking to the molding teeth 2322, the rotational speed of the rotating dies 2320, 2321 and the tractor 2500 may be adjusted; agents may be supplied to the molding teeth 2322 via the cleaning opening 2370 and/or repellant openings 2380; and/or the temperature of the rotating dies 2320, 2321, core layer 20, or resin chambers 2330, 2331 may be adjusted to improve the production quality.

In some embodiments, the central heating element 2340 may include one or more induction coils 2341 configured to generate eddy currents in the strands 10, which may be electrically conductive, according to well-known principles of induction heating. Heating of the strands 10 causes the partially-formed composite elevator belt 100 to be heated from the inside out, thereby reducing the occurrence of air bubbles as the core layer 20 and/or the teeth 30, 40 cure. As noted above, in some embodiments, the core layer 20 material and/or teeth 30, 40 material may include conductive additives also capable of being heated by the induction coils 2341. Other embodiments of the central heating element 2340 may utilize heating devices other than induction coils. Similarly, the entry heating element 2350 and/or exit heating element 2360 may include induction coils or other heating devices.

The central heating element 2340, entry heating element 2350, exit heating element 2360, and cooling chambers 2323 are configured to work in conjunction to finely control the temperature of the partially-formed composite elevator belt 100 throughout the formation of the core layer 20 and the teeth 30, 40. As such, the pultrusion die 2300 permits a wider variety of materials to be used in production of the composite elevator belt 100 than is possible utilizing conventional pultrusion processes. In some embodiments, the core layer 20 and the teeth 30, 40 may be formed of fast curing materials, allowing the overall production speed of the composite elevator belt 100 to be increased relative to conventional pultrusion processes.

Referring back to FIG. 9, the jacket extruder 2400 is configured to form the first jacket layer 50 and the second jacket layer 60 of the composite elevator belt 100. The jacket extruder 2400 includes at least one extruder head 2410 for depositing the material that forms the first and second jacket layers 50, 60 onto the tip portions 33, 43 of the first and second pluralities of teeth 30, 40, respectively. The jacket extruder 2400 is the final component that performs a shaping or forming operation to the partially formed composite elevator belt 100. Thus, the composite elevator belt 100 exits the jacket extruder 2400 in a finished state having all of the structural features described above with reference to FIGS. 1-7. The jacket extruder 2400 has openings at both ends along the pulling direction DP to allow the partially formed composite elevator belt 100 to enter the jacket extruder 2400 and the finished composite elevator belt 100 to exit the jacket extruder 2400.

The tractor 2500 applies a pulling force to pull the composite elevator belt 100 through the preceding components of the manufacturing apparatus 2000. The pulling force of the tractor 2500 is imparted to the composite elevator belt 100 by one or more driven rollers 2510 configured to frictionally engage the finished composite elevator belt 100 exiting the jacket extruder 2400. The driven rollers 2510 may be rotated by a motor to govern the speed of the manufacturing process.

The spooler 2600 is configured to wind the finished composite elevator belt 100 into a spool for packaging. The spooler includes a driven axle 2610 configured to wind the composite elevator belt 100 into a spool at the same rate at which the tractor 2500 pulls the composite elevator belt 100.

Figure 12:
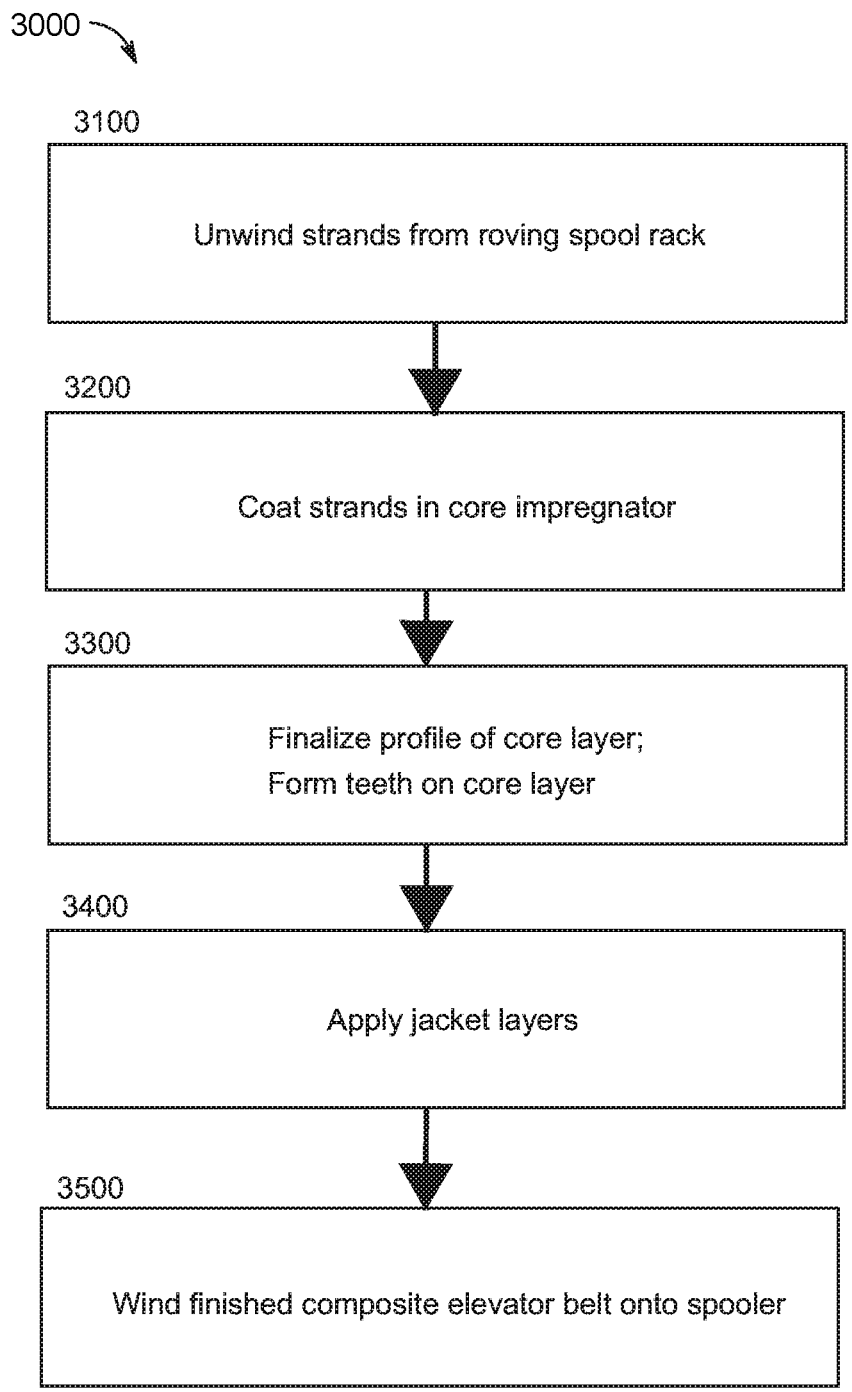
FIG. 12 is a step diagram of a method of making a composite elevator belt according to the present disclosure.

Having described the individual components of the manufacturing apparatus 2000, further reference is now made to FIG. 12, which is a step diagram 3000 of a method for making the composite elevator belt 100 using the manufacturing apparatus 2000 described above. Generally, the method includes using the tractor 2500 to pull the strands 10 through the core impregnator 2200, the pultrusion die 2300, and the jacket extruder 2400 to form the finished composite elevator belt 100. At step 3100, the tractor 2500 unwinds the strands 10 from the spools 2110 of the roving spool rack 2100. As noted above, the spools 2110 may be motorized or equipped with a brake to provide a constant pre-tension in the roving strands 10 to enhance the quality of the finished composite elevator belt 100 and to prevent compression forces in the strands 10 due to unequal cooling during the curing of the manufacturing process.

At step 3200, the strands 10 are pulled by the tractor 2500 into the bath chamber 2220 of the core impregnator 2200, where the strands 10 are coated with the material forming the core layer 20. More particularly, the bath chamber 2220 is supplied with liquid phase core layer 20 material via the injector 2210. The material in the bath chamber 2200 may or may not be pressurized. As the strands 10 pass through the material in the bath chamber 2200, some or all of the material adheres to the strands 10 to at least partially form the core layer 20 of the composite elevator belt 100.

At step 3300, the partially-formed composite elevator belt 100 is pulled by the tractor 2500 into the pultrusion die 2300. The incoming strands 10 are heated by the entry heating element 2350 to a predetermined temperature for optimally controlling the cure of the materials used for the core layer 20 and the first and second pluralities of teeth 30, 40. In the housing 2310, the rotating rotating dies 2320, 2321 apply pressure to the core layer 20 material applied in the core impregnator 2200 to finalize the profile of the core layer 20. In addition, the pressure applied to rotating dies 2320, 2321 forces bubbles and any other discontinuities and imperfections out of the core layer 20. Concurrently with forming the core layer 20, the rotating dies 2320, 2321 draw material from the resin chambers 2330, 2331 and apply it to the core layer 20 to form the first and second pluralities of teeth 30, 40 integrally with the core layer 20. The rotational speed of the rotating dies 2320, 2321 may be calibrated to define the spacing at which the first and second pluralities of teeth 30, 40 are deposited on the core layer 20. Specifically, increasing the rotational speed of the rotating dies 2320, 2321 decreases the spacing between the teeth 30, 40, and decreasing the rotational speed of the rotating dies 2320, 2321 increases the spacing between the teeth 30, 40.

In some embodiments, the rotational speed of the rotating dies 2320, 2321 may be adjusted during production of the composite elevator belt 100 to change the tooth spacing at different sections of the composite elevator belt 100. In some embodiments, the rotating dies 2320, 2321 may be rotated at different speeds relative to one another such that the teeth of the first plurality of teeth 30 have different spacing than the teeth of the second plurality of teeth 40. In some embodiments, the rotating dies 2320, 2321 may be synchronized to define an offset of the teeth 30, 40 on both sides of the load carrier. In one embodiment, the rotational speed of the rotating dies 2320, 2321 is synchronized with the linear speed of the core layer 20 being pulled through the pultrusion die 2300. That is, the linear speed of the core layer 20 may be equal to circumferential speed at which each of the molding teeth 2322 rotate, such that with each 360° rotation of the rotating dies 2320, 2321, a length of the core layer 20 equal to the circumference of the rotating dies 2320, 2321 passes through the pultrusion die 2300. The rotating dies 2320, 2321 may be motorized to assist the tractor 2500 and to enhance the quality of the outer load carrier shape.

The central heating element 2340 and the cooling chambers 2323 regulate the temperature of the strands 10, the core layer 20, and the material forming the teeth 30, 40 to optimally control curing of the core layer 20 and the teeth 30, 40. As some of the molding teeth 2322 of the rotating dies 2320, 2321 are applying the teeth 30, 40 to the core layer 20, others of the molding teeth 2322 are treated with agents from the cleaning openings 2370 and the repellant openings 2380 before being reintroduced to the resin chambers 2330, 2331. The outgoing partially-formed composite elevator belt 100 is heated by the exit heating element 2360 to a predetermined temperature for optimally controlling the cure of the materials used for the core layer 20 and the first and second pluralities of teeth 30, 40. At this stage, the core layer 20 and/or the teeth 30, 40 may or may not be fully cured.

At step 3400, the partially-formed composite elevator belt 100 is pulled by the tractor 2500 into the jacket extruder 2400. The first jacket layer 50 and second jacket layer 60 are applied to the tip portions 33, 43 of the first and second pluralities of teeth 30, 40. The at least one extruder head 2410 of the jacket extruder 2400 may be calibrated such that the material of the first and second jacket layers 50, 60 is deposited onto the teeth 30, 40 in liquid phase, with or without filling the transverse grooves between the flanks 31, 41 of adjacent teeth 30, 40. The first and second jacket layers 50, 60 are then cured so as to be integral with the teeth 30, 40. Additionally, the core layer 20 and the teeth 30, 40, if not fully cured already, finish their respective curing processes.

At step 3500, the finished composite elevator belt 100 is wound onto the spooler 2600 via the driven axle 2610. The driven axle 2610 may be calibrated to wind the composite elevator belt 100 onto the spooler 2600 at the same rate at which the composite elevator belt 100 is pulled by the tractor 2500 in order to prevent the occurrence of slack in the composite elevator belt 100. The composite elevator belt 100 is wound onto the spooler 2600 until the desired length of the composite elevator belt 100 has been attained. At that point, the spool of the composite elevator belt 100 may be removed from the spooler 2600. As may be appreciated by those skilled in the art, the composite elevator belt 100 may be produced to a theoretically infinite length limited only by the supply of the raw materials for the strands 10, core layer 20, teeth 30, 40, and jacket layers 50, 60.

Steps 3100-3500 may be performed concurrently with one another as the composite elevator belt 100 is continuously drawn through the manufacturing apparatus 2000. That is, as the first and second jacket layers 50, 60 are applied to a first portion of the partially-formed composite elevator belt 100 by the jacket extruder 2400, the teeth 30, 40 are applied to a second portion of the partially-formed composite elevator belt 100 by the pultrusion die 2300, and the core layer 20 is applied to a third portion of the partially-formed composite elevator belt 100 by the core impregnator 2200. It should be understood that the first, second, and third portions of the partially-formed composite elevator belt 100 referred to above are not discrete, but rather are continuously changing as the partially-formed composite elevator belt 100 is drawn through the manufacturing apparatus 2000.

In other embodiments of the method for making the composite elevator belt 100, one or more of steps 3100-3500 may be performed as discrete operations rather than as a continuous process. For example, steps 3100-3300 may be performed to unwind the strands 10 from the roving spool rack 2100, apply the core layer 20 material to the strands, finalize profile of the core layer 20 and form the teeth 30, 40 on the core layer 20. The load carrier may then be wound onto a temporary storage spool, and steps 3400-3500 may be performed separately. It is to be understood that this embodiment is merely exemplary, and those skilled in the art will appreciate that any individual step or combination of steps 3100-3500 may be performed as a discrete process distinct from the remaining steps 3100-3500.

The manufacturing apparatus 2000 described with reference to FIGS. 9-11 and the step diagram 3000 described with reference to FIG. 12 are directed to making embodiments of the composite elevator belt 100 having first and second pluralities of teeth 30, 40 and first and second jacket layers 50, 60, such as the embodiments of the composite elevator belt 100 shown in FIGS. 1-6. However, those skilled in the art will appreciate that the manufacturing apparatus 2000 and the step diagram 3000 may be readily modified for making embodiments of the composite elevator belt 100 having only one plurality of teeth 40 and one jacket layer 60, such as the embodiments of the composite elevator belt 100 shown in FIG. 7. For example, the pultrusion die 2300 may include only a single rotating die 2320 and a single resin chamber 2330 such that the teeth of the plurality of teeth 40 are formed on only one side of the core layer 20. Similarly, the jacket extruder 2400 may be configured to apply only a single jacket layer 60 to the core layer 20.

Figure 13A:
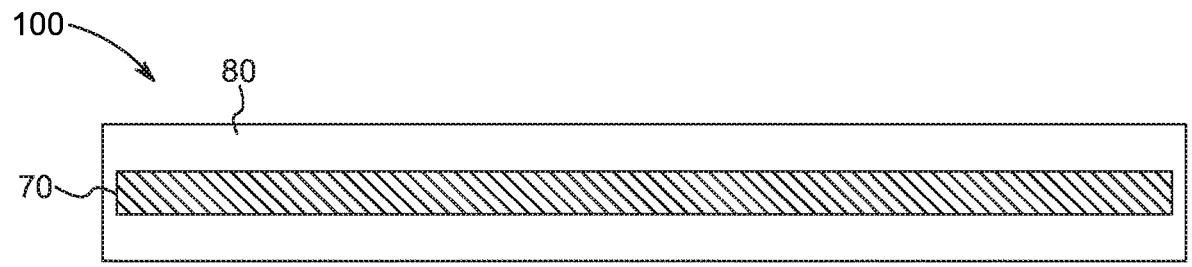
FIGS. 13A-13D are front views of the composite elevator belt according to other embodiments of the present disclosure.
Figure 13B:
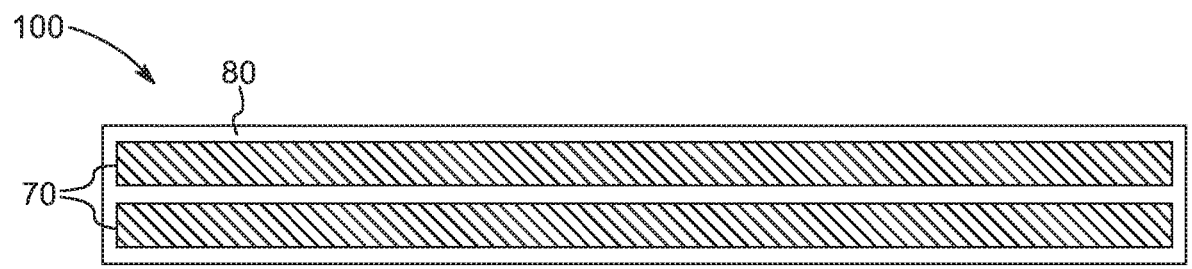
Figure 13C:
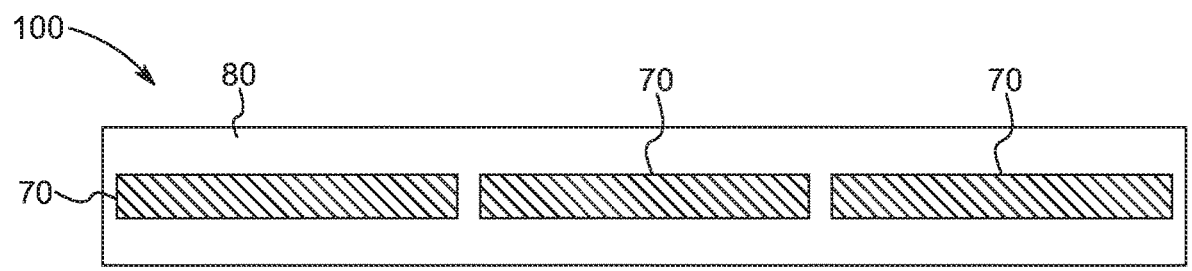
Figure 13D:
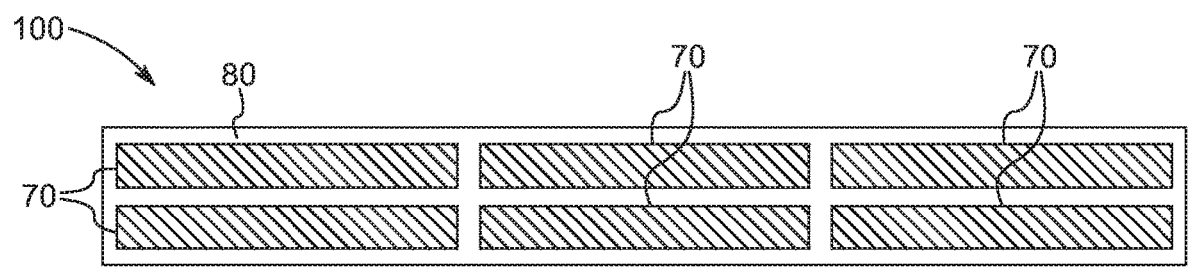

Referring now to FIGS. 13A-13D and FIGS. 14A-14L, additional embodiments of composite elevator belts 100 according to the present disclosure are shown. FIGS. 13A-13D show front views of embodiments of the composite elevator belt 100 having one or more load carriers 70. Each load carrier 70 includes at least one core layer 20 and, optionally, at least one plurality of teeth 30 which may be arranged in any manner, such as described in any of the embodiments of FIGS. 1-6 or FIGS. 14A-14L. The at least one load carrier 70 is encased is a full jacket layer 80. The composite elevator belt 100 may include a single load carrier 70 as shown in FIG. 13A, multiple load carriers 70 arranged vertically as shown in FIG. 13B, multiple load carriers 70 arranged horizontally as shown in FIG. 13C, or an array of load carriers arranged both vertically and horizontally as shown in FIG. 13D. The full jacket 80 encloses all sides of each of the load carriers 70 in the composite elevator belt 100.

Figure 14A:
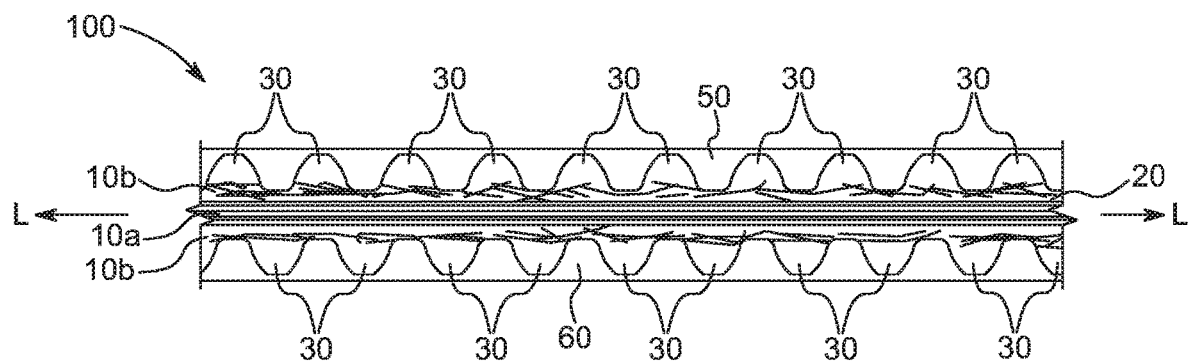
FIG. 14A-14L are side views of a section of a composite elevator belt according to other embodiments of the present disclosure.
Figure 14B:
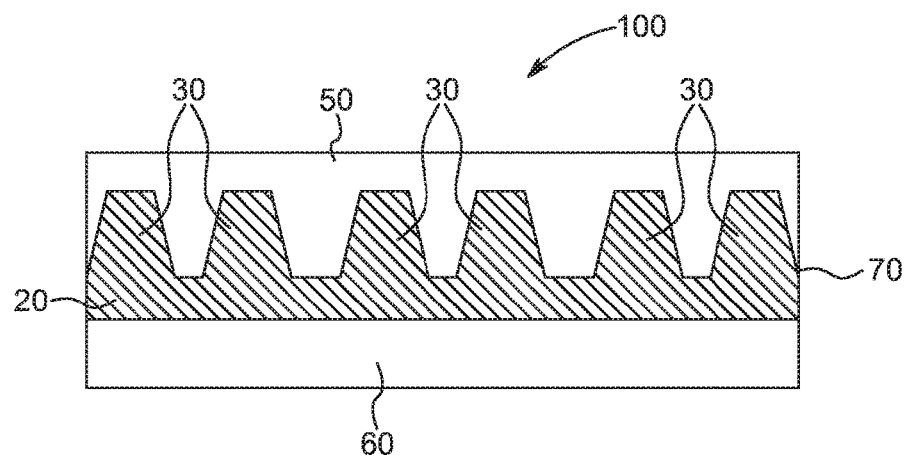

FIGS. 14A-14L show side views of sections of various embodiments of the composite elevator belt 100. As these embodiments include many of the same features as have already been described with reference to FIGS. 1-7, only the differences will be discussed. As shown in FIG. 14A, at least one strand 10 encased by the core layer 20 may include one or more continuous fibers 10a extending continuously in the longitudinal direction L arranged between layers of entangled outer fibers 10b. The embodiment shown in FIG. 14B is similar to that of FIG. 7 in that it includes only a single plurality of teeth 30. However, the embodiment of FIG. 14B includes both the first jacket layer 50 and the second jacket layer 60, with the second jacket layer 60 applied directly to the bottom surface 22 of the core layer 20. Additionally, the first jacket layer 50 fills the gaps between adjacent teeth 30.

Figure 14C:
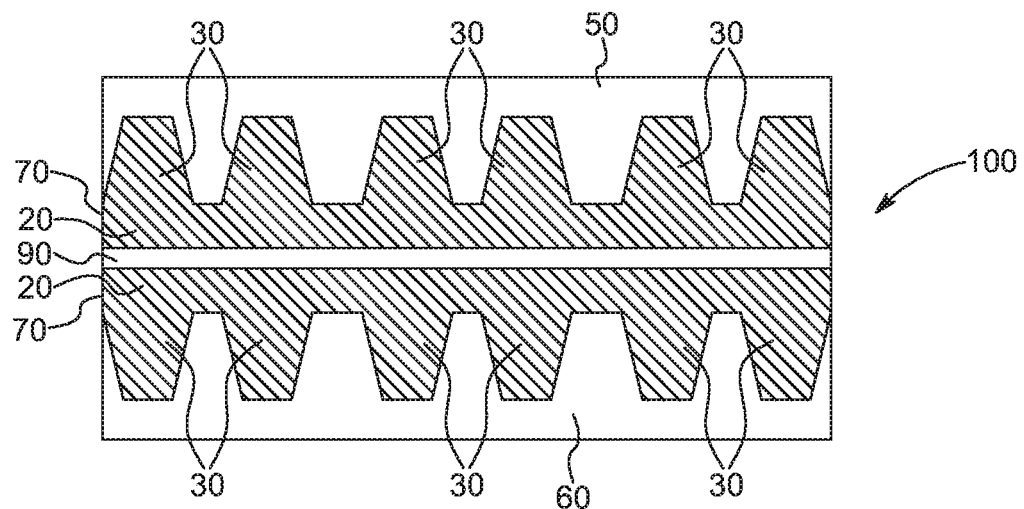
Figure 14D:
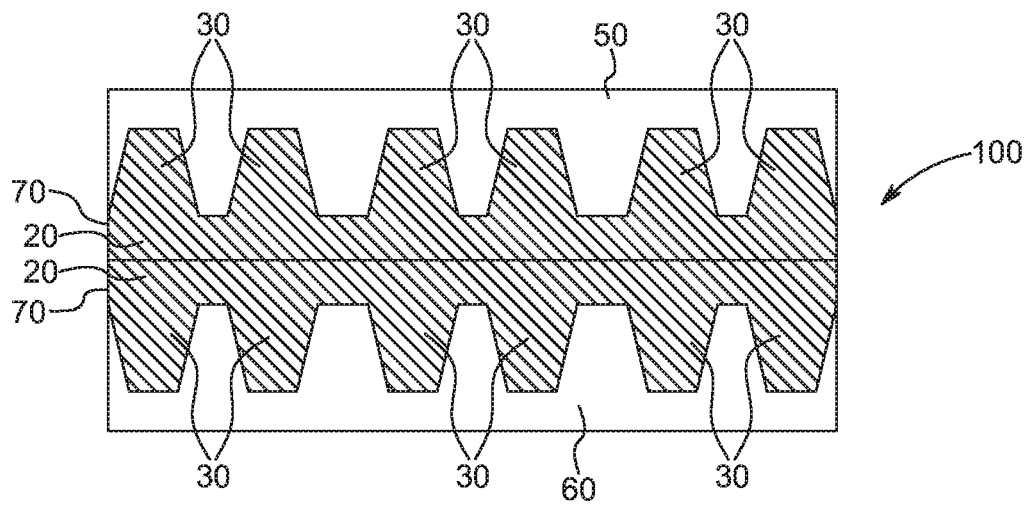
Figure 14E:
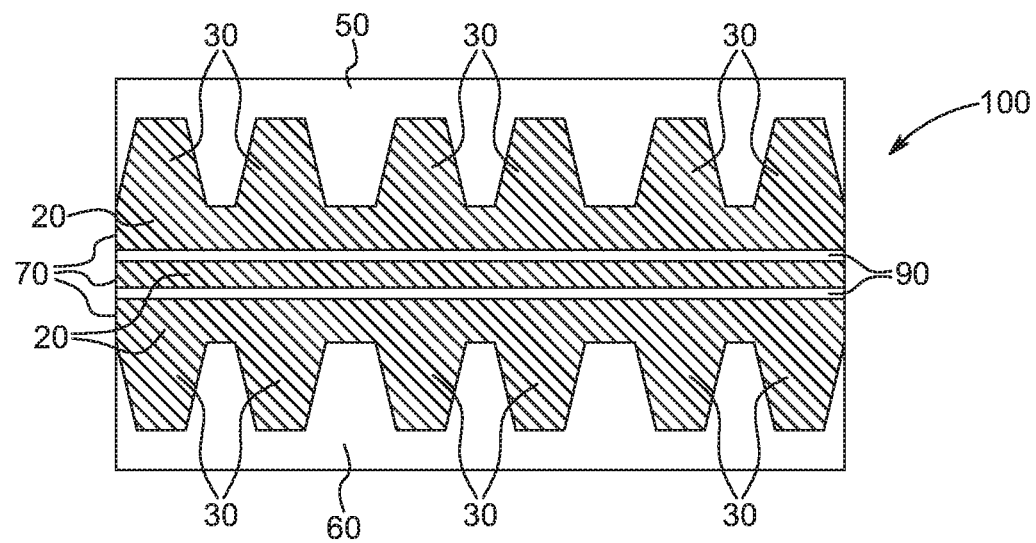
Figure 14F:
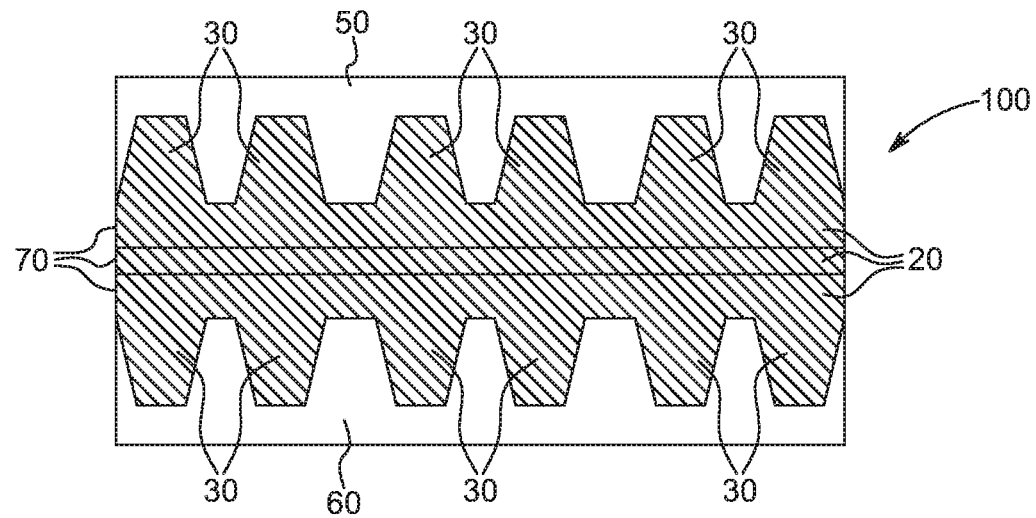

FIGS. 14C-14L illustrate embodiments of the composite elevator belt 100 including separately formed layers. The embodiment of FIG. 14C includes two load carriers 70 spaced apart from each other by a central jacket layer 90. Each load carrier 70 includes a core layer 20 and a plurality of teeth 30. The load carriers 70 are arranged on opposite sides of the central jacket layer 90 with the core layers 20 adjacent to one another. The embodiment of FIG. 14D is substantially similar to that of FIG. 14C, except the core layers 20 directly abut one another without the central jacket layer 90 between them. The core layers 20 may be unattached to one another or attached with an adhesive. The embodiment of FIG. 14E is substantially similar to that of FIG. 14C, but includes a second central jacket layer 90 and a third load carrier 70. The third load carrier 70 includes only a core layer 20, and is arranged between the central jacket layers 90. The embodiment of FIG. 14F is substantially similar to that of FIG. 14E, but lacks the central jacket layers 90. Instead, the core layers 20 of the load carriers 70 directly abut one another, and may be unattached to one another or attached with an adhesive.

Figure 14G:
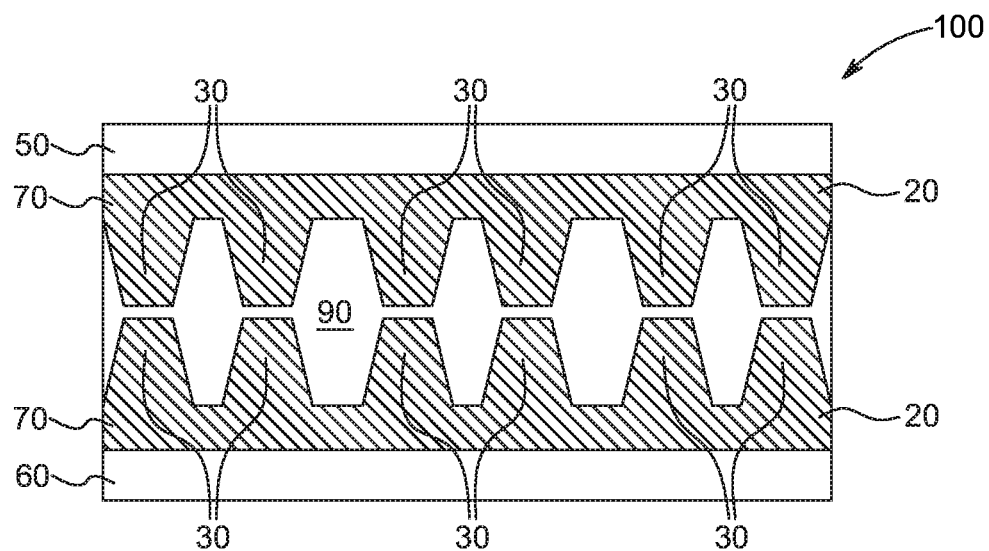
Figure 14H:
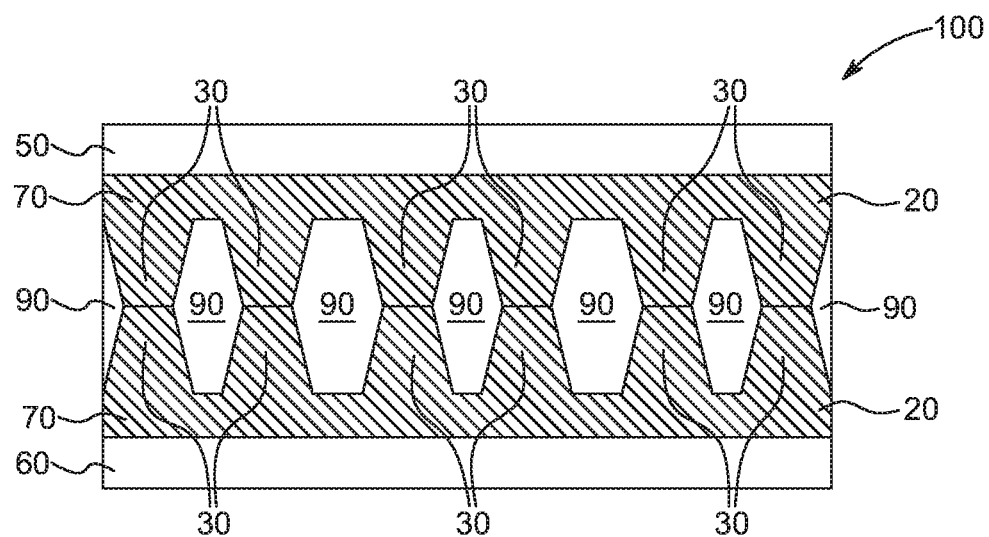
Figure 14I:
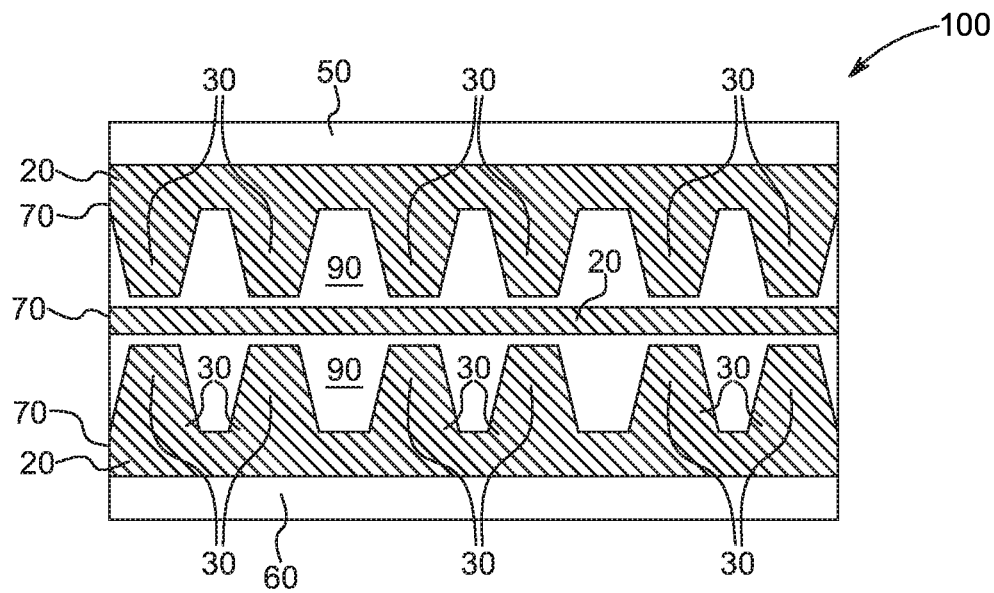
Figure 14J:
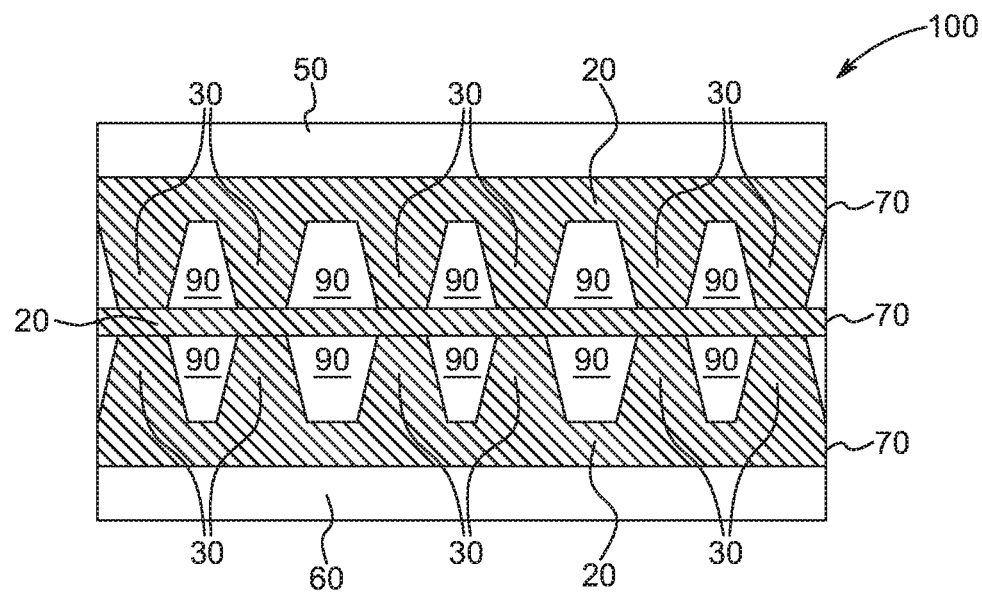

The embodiment of FIG. 14G is substantially similar to that of FIG. 14C, except that the load carriers 70 are inverted such their respective pluralities of teeth 30 face one another. The central jacket layer 90 extends between the load carriers 70 and fills the spaces between adjacent teeth 30. The embodiment of FIG. 14H is substantially similar to that of FIG. 14G, except that the tip portions 33 of the teeth 30 of the opposing load carriers 70 abut one another. The tip portions 33 of the abutting teeth 30 may be unattached to one another or attached with an adhesive. The central jacket layer 90 fills the spaces between adjacent teeth 30. In an alternative embodiment, the spaces between adjacent teeth may be void of material. The embodiment of FIG. 14I is substantially similar to that of FIG. 14G, except that a third load carrier 70 including a core layer 20 is arranged between the opposing teeth 30 of the other load carriers 70. Two central jacket layers 90 are arranged on either side of the third load carrier 70 and fill the spaces between adjacent teeth 30. The embodiment of FIG. 14J is substantially similar to that of FIG. 14I, except that the load carriers 70 abut one another. Specifically, the tip portions 33 of the opposing pluralities of teeth 30 abut opposite sides of the third load carrier 70. The central jacket layers 90 fill the spaces between adjacent teeth 30. In an alternative embodiment, the spaces between adjacent teeth may be void of material. The load carriers 70 may be unattached or attached to one another with an adhesive. In each of FIGS. 14C-14J, the opposing pluralities of teeth 30 are shown as mirror images of one another. However, it is to be understood that the pluralities of teeth 30 may also be staggered or offset relative to one another.

Figure 14K:
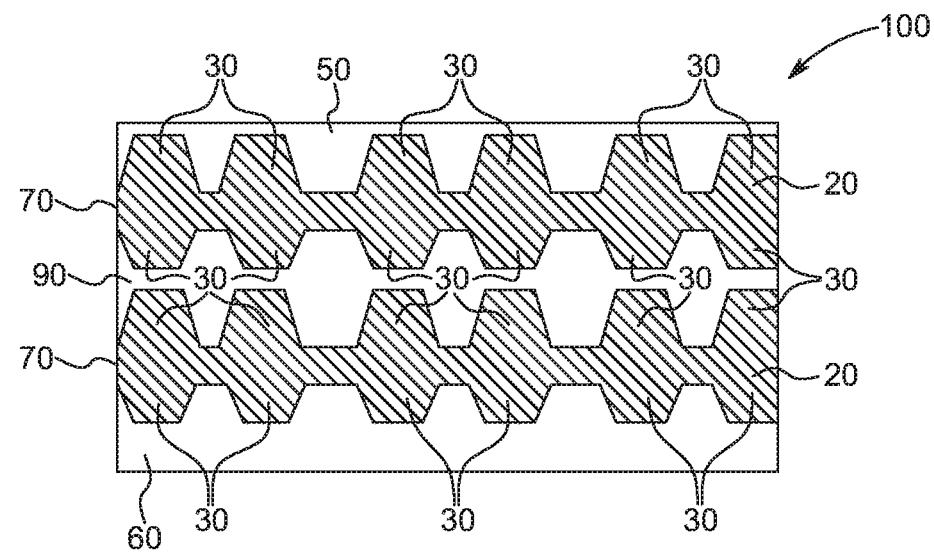
Figure 14L:
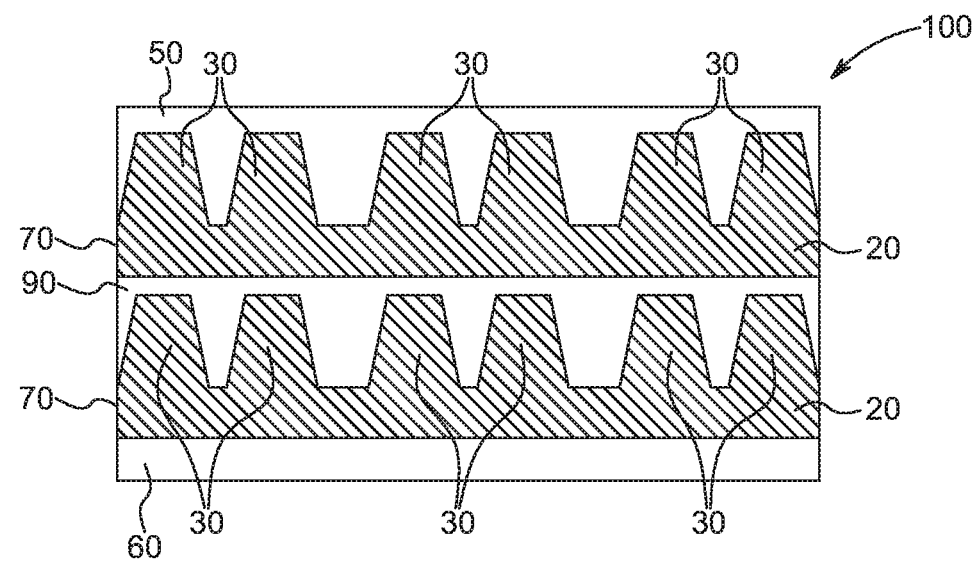

The embodiment shown in FIG. 14K includes identical load carriers 70 substantially similar to that of FIG. 14D arranged parallel to one another and separated by a central jacket layer 90. The embodiment shown in FIG. 14L includes identical load carriers 70 substantially similar to that of FIG. 14B arranged parallel to one another and separated by a central jacket layer 90. In each of FIGS. 14K and 14L, the load carriers 70 are shown with their respective pluralities of teeth 30 aligned vertically. However, it is to be understood that the pluralities of teeth 30 may also be staggered or offset relative to one another.

It is to be further understood that the embodiments of the composite elevator belt 100 shown in FIGS. 13A-14L are merely exemplary, and these embodiments may be combined with one another or other embodiments shown and described herein without departing from the scope of the present application.

The embodiments of the composite elevator belt 100 shown in FIGS. 13B-14L, which include multiple load carriers 70, may be produced using a modified embodiment of the manufacturing apparatus 2000 described above with reference to FIGS. 9-11. Specifically, the pultrusion die 2300 may include multiple processing chambers for concurrently forming each of the load carriers 70, which may then be joined in the jacket extruder 2400 with application of the jacket layers 50, 60, 80, 90. Alternatively, each of the load carriers 70 may be formed in a separate operation, and may later be combined in a secondary forming process. Other methods for making the various embodiments of the composite elevator belt 100 described with reference to FIGS. 13A-14L may be appreciated by those skilled in the art, consistent with the principles of operation of the manufacturing apparatus 2000.

While several examples of a composite elevator belt for an elevator system, as well as methods and apparatuses for making the same, are shown in the accompanying figures and described in detail hereinabove, other examples will be apparent to, and readily made by, those skilled in the art without departing from the scope and spirit of the present disclosure. For example, it is to be understood that aspects of the various embodiments described hereinabove may be combined with aspects of other embodiments while still falling within the scope of the present disclosure. Accordingly, the foregoing description is intended to be illustrative rather than restrictive. The assembly of the present disclosure described hereinabove is defined by the appended claims, and all changes to the disclosed assembly that fall within the meaning and range of equivalency of the claims are to be embraced within their scope.

What is claimed is:

1. A composite elevator belt comprising:
    at least one load carrier strand extending in a longitudinal direction;
    a core layer encasing the at least one load carrier strand;
    a first plurality of teeth extending transversely across a top surface of the core layer, the first plurality of teeth comprising a root portion associated with the core layer and a tip portion; and
    a first jacket layer extending in the longitudinal direction, at least the tip portion of the first plurality of teeth being associated with a bottom surface of the first jacket layer; wherein the tip portion is associated with the bottom surface of the first jacket layer such that the core layer and the first jacket layer define a transversely extending groove between adjacent teeth of the first plurality of teeth that is void of material.

2. The composite elevator belt of claim 1, wherein each of the first plurality of teeth extends transversely across the top surface of the core layer in a direction not parallel to the longitudinal direction.

3. The composite elevator belt of claim 1, further comprising:
    a second plurality of teeth extending transversely across a bottom surface of the core layer, the second plurality of teeth comprising a root portion associated with the core layer and a tip portion; and
    a second jacket layer extending in the longitudinal direction, at least the tip portion of the second plurality of teeth associated with a top surface of the second jacket layer.

4. The composite elevator belt of claim 3, wherein each of the second plurality of teeth extends transversely across the bottom surface of the core layer in a direction not parallel to the longitudinal direction.

5. The composite elevator belt of claim 3, wherein the first plurality of teeth is a mirror image of the second plurality of teeth reflected about the core layer in the longitudinal direction.

6. The composite elevator belt of claim 3, wherein the first plurality of teeth is offset along the longitudinal direction relative to the second plurality of teeth.

7. The composite elevator belt of claim 1, wherein each of the first plurality of teeth has a polygonal-shaped profile in a cross section perpendicular to the longitudinal direction, wherein the polygonal-shaped profile comprises one or more of trapezoidal-shaped, parallelogram-shaped, triangle-shaped, and pentagonal-shaped.

8. The composite elevator belt of claim 1, wherein the core layer and the first jacket layer are of varying composition.

9. The composite elevator belt of claim 1, wherein each of the first plurality of teeth has a rounded profile in a cross section perpendicular to the longitudinal direction, the rounded profile comprising one or more of semicircular-shaped, arcuate-shaped, elliptical-shaped, oval-shaped, and hemispherical-shaped.

10. The composite elevator belt of claim 1, wherein the teeth of the first plurality of teeth vary in profile along the length of the composite elevator belt.

11. The composite elevator belt of claim 1, wherein the teeth of the first plurality of teeth are integrally formed with the core layer.

12. The composite elevator belt of claim 1, wherein the teeth of the first plurality of teeth are integrally formed with the first jacket layer.

13. The composite elevator belt of claim 1, wherein the at least one strand is formed of an electrically conductive material.

14. The composite elevator belt of claim 1, wherein a pitch of the first plurality of teeth varies over the length of the belt.

15. An elevator system, comprising:
  an elevator shaft having a support frame;
  an elevator car movable along a vertical travel path defined by the elevator shaft;
  a motor arrangement comprising at least one drive sheave rotatable via the motor arrangement;
  at least one elevator sheave connected to one of the elevator car and the support frame; and
  at least one composite elevator belt in frictional tractive engagement with the drive sheave of the motor arrangement and the at least one elevator sheave, the at least one composite elevator belt comprising:
    at least one load carrier strand extending in a longitudinal direction;
    a core layer encasing the at least one load carrier strand;
    a first plurality of teeth extending transversely across a top surface of the core layer, the first plurality of teeth comprising a root portion associated with the core layer and a tip portion; and
    a first jacket layer extending in the longitudinal direction, at least the tip portion of the first plurality of teeth being associated with a bottom surface of the first jacket layer; wherein the tip portion of the first plurality of teeth of the at least one composite elevator belt is associated with the bottom surface of the first jacket layer such that the core layer and the first jacket layer define a transversely extending groove between adjacent teeth of the first plurality of teeth that is void of material.

16. The elevator system of claim 15, wherein each of the first plurality of teeth of the at least one composite elevator belt extends transversely across the top surface of the core layer in a direction not parallel to the longitudinal direction.

17. The elevator system of claim 15, wherein the at least one composite elevator belt further comprises:
  a second plurality of teeth extending transversely across a bottom surface of the core layer, the second plurality of teeth comprising a root portion associated with the core layer and a tip portion; and
  a second jacket layer extending in the longitudinal direction, at least the tip portion of the second plurality of teeth associated with a top surface of the second jacket layer.

18. The elevator system of claim 15, wherein each of the second plurality of teeth of the at least one composite elevator belt extends transversely across the bottom surface of the core layer in a direction not parallel to the longitudinal direction.

\* \* \* \* \*